US012810404B2

(12) United States Patent
Park et al.

(10) Patent No.: US 12,810,404 B2
(45) Date of Patent: Nov. 24, 2026

(54) IMAGE PROCESSING DEVICE AND OPERATION METHOD THEREOF

(71) Applicant: Samsung Electronics Co., Ltd., Suwon-si (KR)

(72) Inventors: Jaesung Park, Suwon-si (KR); Jiman Kim, Suwon-si (KR); Cheon Lee, Suwon-si (KR); Seongwoon Jung, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 177 days.

(21) Appl. No.: 18/406,798

(22) Filed: Jan. 8, 2024

(65) Prior Publication Data

US 2024/0144455 A1 May 2, 2024

Related U.S. Application Data

(63) Continuation of application No. PCT/KR2022/009983, filed on Jul. 8, 2022.

(30) Foreign Application Priority Data

Jul. 9, 2021 (KR) ........................ 10-2021-0090571
Mar. 30, 2022 (KR) ........................ 10-2022-0039872

(51) Int. Cl.
*G06T 3/40* (2024.01)
*G06T 5/00* (2024.01)
(Continued)

(52) U.S. Cl.
CPC .............. *G06T 7/0002* (2013.01); *G06T 3/40* (2013.01); *G06T 7/62* (2017.01); *G06T 7/70* (2017.01);
(Continued)

(58) Field of Classification Search
None
See application file for complete search history.

(56) References Cited

U.S. PATENT DOCUMENTS 8,548,193 B2 10/2013 Saund et al.
9,852,496 B2 12/2017 Marchand et al.
(Continued)

FOREIGN PATENT DOCUMENTS

CN 110188712 * 8/2019 ........... G06F 18/214
KR 10-2011-0113924 10/2011
(Continued)

OTHER PUBLICATIONS

Research Trends on Related to Artificial Intelligence for the Visually Impaired : Focused on Domestic and Foreign Research in 1993-2020, The Journal of the Korea Contents Association, vol. 20, No. 10, pp. 688-701, Oct. 20, 2020.
(Continued)

*Primary Examiner* — Beniyam Menberu
(74) *Attorney, Agent, or Firm* — STAAS & HALSEY LLP

(57) ABSTRACT

Disclosed is an image processing method including obtaining, from a first image, object information of an important object included in the first image, obtaining control information for image quality processing, and obtaining a second image by performing image quality processing on the important object from the first image based on the object information and user control information.

15 Claims, 15 Drawing Sheets

(51) Int. Cl.

| | |
|---|---|
| ***G06T 7/00*** | (2017.01) |
| ***G06T 7/62*** | (2017.01) |
| ***G06T 7/70*** | (2017.01) |
| ***G06V 10/25*** | (2022.01) |

(52) U.S. Cl.

CPC .... *G06V 10/25* (2022.01); *G06T 2207/20084* (2013.01); *G06T 2207/30168* (2013.01); *G06V 2201/07* (2022.01)

(56) References Cited

U.S. PATENT DOCUMENTS

| | | | | |
|---|---|---|---|---|
| 10,194,112 | B2 | 1/2019 | Baek et al. | |
| 10,867,449 | B2 | 12/2020 | Lewis et al. | |
| 10,963,999 | B2 | 3/2021 | Werblin et al. | |
| 11,128,909 | B2 | 9/2021 | Cho et al. | |
| 2004/0136570 | A1 | 7/2004 | Ullman et al. | |
| 2004/0228528 | A1* | 11/2004 | Lao | G06V 40/16 382/167 |
| 2007/0147700 | A1* | 6/2007 | Jeong | G06T 11/60 382/199 |
| 2011/0170742 | A1* | 7/2011 | Fukuchi | H04N 21/42204 382/103 |
| 2011/0249886 | A1 | 10/2011 | Park et al. | |
| 2017/0147174 | A1* | 5/2017 | Olejniczak | H04N 21/4223 |
| 2017/0360295 | A1 | 12/2017 | Oz et al. | |
| 2018/0125716 | A1 | 5/2018 | Cho et al. | |
| 2018/0189567 | A1 | 7/2018 | Maheriya et al. | |
| 2019/0012931 | A1 | 1/2019 | Candelore et al. | |
| 2021/0092472 | A1* | 3/2021 | Cho | H04N 21/4532 |
| 2022/0222872 | A1* | 7/2022 | Ghosh | G06N 3/047 |

FOREIGN PATENT DOCUMENTS

| | | | | |
|---|---|---|---|---|
| KR | 10-2017-0104463 | | 9/2017 | |
| KR | 10-1848526 | | 4/2018 | |
| KR | 10-2021-0051722 | | 5/2021 | |
| KR | 10-2021-0081852 | | 7/2021 | |
| KR | 10-2315311 | | 10/2021 | |
| KR | 10-2384520 | | 4/2022 | |
| KR | 10-2393299 | | 5/2022 | |
| WO | WO 2019196133 | * | 10/2019 | A61F 9/00 |

OTHER PUBLICATIONS

Enhanced Object Extraction Method Based on Multi-channel Saliency Map, Journal of The Institute of Electronics and Information Engineers, vol. 53, No. 2, Feb. 2016.

Current status and latest trends of deep learning-based Super Resolution technology (Apr. 2020).

A Brief Survey of Recent Edge-Preserving Smoothing Algorithms on Digital Images, Procedia Computer Science 00 (2015) 1-40, Mar. 25, 2015.

Video Salient Object Detection via Fully Convolutional Networks, IEEE Transactions on Image Processing, Sep. 19, 2017.

International Search Report dated Oct. 14, 2022, in PCT Application No. PCT/KR2022/009983.

Supplemental European Search Report dated October 169, 2024 issued EP 22 83 8055.

Office Action dated Apr. 21, 2026, issued Korean Application No. 10-2022-0039872.

European Office Action issued Sep. 14, 2026, for Application No. 22 838 055.6.

* cited by examiner

IMAGE PROCESSING DEVICE AND OPERATION METHOD THEREOF

CROSS-REFERENCE TO RELATED APPLICATIONS

This is a continuation application of International Application No. PCT/KR2022/009983, filed Jul. 8, 2022, which is incorporated herein by reference in its entirety, it being further noted that foreign priority benefit is based upon Korean Patent Application No. 10-2021-0090571, filed Jul. 9, 2021, and Korean Patent Application No. 10-2022-0039872, filed Mar. 30, 2022, which are incorporated by reference herein in their entireties.

TECHNICAL FIELD

Various disclosed embodiments relate to an image processing device and an operating method thereof, and more particularly, to an image processing device for rendering images according to user characteristics, and an operating method thereof.

BACKGROUND ART

When people with visual impairment view images, it is difficult for the people with visual impairment to accurately recognize objects included in the images. Accordingly, people with visual impairment often use a magnification function to view images. However, when the magnification function is used, a resolution of the video decreases, and thus, there is a problem in that viewing needs of the people with visual impairment cannot be satisfied.

Further, people with visual impairment tend to focus on recognizing overall outlines of objects within images or components within the objects rather than focusing on the details of an entire image.

Accordingly, there is a need for a technology of providing images in which objects included in the image may be more accurately recognized, according to disability characteristics of the people with visual impairment, so that the people with visual impairment may enjoy the content.

DISCLOSURE

Technical Solution

An image processing device according to an embodiment may include a memory storing one or more instructions, and a processor configured to execute the one or more instructions stored in the memory to obtain, from a first image, object information of an important object included in the first image, obtain control information for image quality processing, and obtain a second image by performing image quality processing on the important object based on the object information and the control information.

According to an embodiment, the object information includes information about at least one a type, location, and size of the important object.

According to an embodiment, the processor may be further configured to execute the one or more instructions to detect a plurality of objects from the first image, output object identification information indicating the plurality of objects, and identify an object selected from a user as the important object to correspond to the outputting of the object identification information.

According to an embodiment, the control information may include control information of at least one of whether to enlarge an object, a degree of enlargement of the object, outline processing, and flattening processing.

According to an embodiment, the processor may be further configured to execute the one or more instructions to perform, according to the control information, at least one of upscaling of the object, outline processing around the object, and flattening processing of an inside of the object.

According to an embodiment, (a) the control information may include at least one of inference control information and real-time user control information, (b) the inference control information may be obtained from previous control history information of a user for a previous image, and (c) the real-time user control information may include real-time control information of the user for the first image.

According to an embodiment, the processor may be further configured to execute the one or more instructions to obtain the second image from the first image by using a neural network, and the neural network may be a neural network that has learned an input image, an object area of interest to a user in the input image, and a ground truth image obtained by processing the object area of interest to the user, as a learning data set.

According to an embodiment, the neural network may obtain the second image in which the object is image quality-processed from at least one of the first image, the control information, and the object information.

According to an embodiment, the neural network may obtain flattening parameters and outline parameters for image quality processing for the object from at least one of the first image, user control information, and the object information, and the processor may be further configured to execute the one or more instructions to obtain the second image quality-processed by adjusting, according to a user control signal, a blending degree of an image quality-processed according to the flattening parameters and an image quality-processed according to the outline parameters.

According to an embodiment, (a) the image quality processing may include at least one of outline processing of the object, flattening processing of an inside of the object, and upscaling of the object, (b) the outline processing of the object may include processing of at least one of a detail, intensity, and color of an outline of the object, (c) the flattening processing of the inside of the object may include processing of adjusting a flattening degree of the inside of the object, and (d) the upscaling of the object may include processing of enlarging a size of the object while maintaining a resolution of the object.

According to an embodiment, an image processing method performed by an image processing device is provided, and the image processing method may include obtaining, from a first image, object information of an important object included in the first image, obtaining control information for image quality processing, and obtaining, from the first image, a second image by performing image quality processing on the important object based on the object information and user control information.

According to an embodiment, the object information may include information about at least one of a type, location, and size of the important object.

According to an embodiment, the method may further include detecting a plurality of objects from the first image, outputting object identification information indicating the plurality of objects, and identifying an object selected from a user as the important object to correspond to the outputting of the object identification information.

According to an embodiment, the control information may include control information for at least one of whether to enlarge an object, a degree of enlargement of the object, outline processing, and flattening processing.

According to an embodiment, a non-transitory computer-readable recording medium having recorded thereon a program for implementing an image processing method is provided, and the image processing method may include obtaining, from a first image, object information of an important object included in the first image, obtaining control information for image quality processing, and obtaining a second image by performing image quality processing on the important object from the first image based on the object information and user control information.

BEST MODE

Mode for Invention

Figure 1:
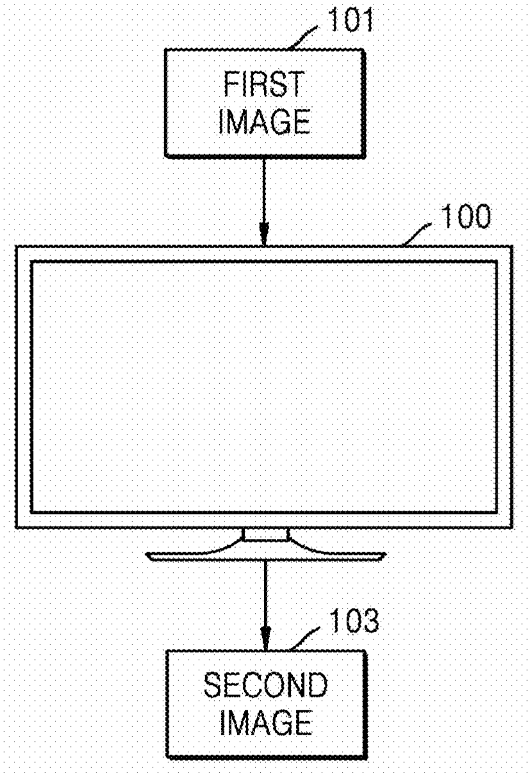
FIG. 1 is a diagram for describing that an image processing device outputs a quality-processed image, according to an embodiment.

In an embodiment, the object information may include information of at least one of a type, location, and size of the important object.

In an embodiment, the processor may be configured to execute the one or more instructions to detect a plurality of objects from the first image, output object identification information indicating the plurality of objects, identify an object selected from a user as the important object to correspond to the outputting of the object identification information.

In an embodiment, the control information may include control information for at least one of whether to enlarge an object, a degree of enlargement of the object, outline processing, and flattening processing.

In an embodiment, the processor may be configured to execute the one or more instructions to perform, according to the control information, at least one of upscaling of the object, outline processing around the object, and flattening processing of the inside of the object.

In an embodiment, the control information may include at least one of inference control information and real-time user control information, and the inference control information may be obtained from previous control history information of the user for a previous image, and the real-time user control information may include real-time control information of the user for the first image.

In an embodiment, the processor may be configured to execute the one or more instructions to obtain the second image from the first image by using a neural network, and the neural network may be a neural network that has learned an input image, an object area of interest to the user in the input image, and a ground truth image obtained by processing the object area of interest to the user, as a learning data set.

In an embodiment, the neural network may obtain a second image obtained by performing image quality processing on the object from at least one of the first image, the control information, and the object information.

In an embodiment, the neural network may obtain flattening parameters and outline parameters for image quality processing for the object from at least one of the first image, the user control information, and the object information, and the processor may obtain a second image quality processed by adjusting, according to a user control signal, a blending degree of an image quality processed according to the flattening parameters and an image with quality processed according to the outline parameters.

In an embodiment, the image quality processing may include at least one of outline processing of the object, flattening processing of the inside of the object, and upscaling of the object, the outline processing of the object may include processing of at least one of a detail, intensity, and color of an outline of the object, the flattening processing of the inside of the object may include processing of adjusting a flattening degree of the inside of the object, and the upscaling of the object may include processing of enlarging a size of the object while maintaining a resolution of the object.

An image processing method performed by an image processing device, according to an embodiment, may include obtaining, from a first image, object information of an important object included in the first image, obtaining control information for image quality processing, and obtaining a second image by performing image quality processing on the important object from the first image based on the object information and the user control information.

A computer-readable recording medium according to an embodiment may be a computer-readable medium having recorded thereon a program for implementing an image processing method, the image processing method including obtaining, from a first image, object information of an important object included in the first image, obtaining control information for image quality processing, and obtaining a second image by performing image quality processing on the important object from the first image based on the object information and the user control information.

In the present disclosure, the expression "at least one of a, b, or c" may refer to "a", "b", "c", "a and b", "a and c", "b and c", "all of a, b, and c", or modifications thereof. Similarly, the expression "at least one of a, b, and c" may refer to "a", "b", "c", "a and b", "a and c", "b and c", "all of a, b, and c", or modifications thereof.

Hereinafter, embodiments of the present disclosure are described in detail with reference to the accompanying drawings, so that a person having ordinary skill in the art to which the present disclosure pertains may easily work the embodiments. However, the present disclosure may be embodied in various different forms and is not limited to embodiments described herein.

Terms used in the present disclosure are described in general terms currently used in consideration of functions mentioned in the present disclosure. However, the terms may denote various other terms, depending on an intent of a technician working in this field, a case, or advent of new technology. Accordingly, the terms used in the present disclosure are not construed only by the names thereof and should be understood based on the meanings included in the terms and overall content of the present disclosure.

In addition, the terms used in the present disclosure are used merely to describe a specific embodiment and are not intended to limit the present disclosure.

Throughout the specification, when it is referred that a portion is "connected" to other portions, this may include not only a case in which the portion is "directly connected" to the other portions, but also a case in which the portion is "electrically connected" to the other portions with other elements therebetween.

The term "the" and indicators similar thereto used in the present specification, in particular, the patent claims, may denote both singular and plural numbers. In addition, unless there is a description that obviously designates an order of operations for describing a method according to the present disclosure, the described operations may be performed in an appropriate order. The present disclosure is not limited by a described order of the described operations.

Not all phrases, such as "in some embodiments" or "in an embodiment", appearing in various places in the present disclosure necessarily indicate the same embodiment.

Some embodiments of the present disclosure may be represented by functional block configurations and various processing operations. Some or all of these functional blocks may be implemented in various numbers of hardware and/or software configurations for executing specific functions. For example, the functional blocks of the present disclosure may be implemented by one or more microprocessors or by circuit configurations for a specific function. In addition, for example, the functional blocks of the present disclosure may be implemented by various programming or scripting languages. The functional blocks may be implemented by an algorithm executed in one or more processors. In addition, the present disclosure may adopt related-art techniques, for electronic environment settings, signal processing, and/or data processing. Terms such as "mechanism", "element", "means", and "configuration" may be used in a broader manner and are not limited to mechanical and physical elements.

In addition, connecting lines or connecting members between elements shown in the drawings merely represent functional connections and/or physical or circuit connections. In actual devices, connections between elements may be represented by various replaceable or additional functional connections, physical connections, or circuit connections.

In addition, terms such as "-or", "-er", "-unit", and "module" described in the specification denote a unit for processing at least one function or operation, and this may be implemented in hardware, software or a combination of hardware and software.

In addition, in the specification, the term "user" denotes a person using an image processing device and may include consumers, evaluators, viewers, managers, or installers. Here, the consumer may be a person watching an image by using an image processing device, including a person with visual impairment.

The present disclosure is described below in detail with reference to the accompanying drawings.

FIG. 1 is a diagram for describing that an image processing device 100 outputs a quality-processed image, according to an embodiment.

Referring to FIG. 1, the image processing device 100 may be an electronic device capable of processing and outputting images. According to an embodiment, the image processing device 100 may be implemented as various types of electronic devices including a display. The image processing device 100 may be of a fixed type or a mobile type and may be a digital television (TV) capable of receiving broadcast, but is not limited thereto. The image processing device 100 may output a video.

In an embodiment, the image processing device 100 may include an image quality processing module. The image quality processing module may provide a viewing assistance function. The viewing assistance function may denote processing image quality of a video and/or a frame so that users with visual impairment may more easily recognize the content.

The image quality processing module may be manufactured in a form of at least one hardware chip and mounted on the image processing device 100 or may be included in the image processing device 100 in the form of a chip or a device. Alternatively, the image quality processing module may also be implemented as a software module.

Depending on an embodiment, the image processing device 100 may perform image quality processing using the image quality processing module. The image processing device 100 may first perform image quality processing on a first image 101 by using the image quality processing module before the first image 101 included in a video is output through the display. The image processing device 100 may perform image quality processing on each of a plurality of frames included in the video.

In an embodiment, the image processing device 100 may include a memory for storing one or more instructions, and a processor for executing the one or more instructions stored in the memory, and the processor may execute the one or more instructions to perform image quality processing on an important object based on object information and control information.

To this end, the image processing device 100 may obtain, from the first image 101, object information of an important object included in the first image 101.

In an embodiment, the important object is an object that attracts the user's attention, and may mean an object subject to image quality processing.

In an embodiment, the object information may include at least one of a type, location, and size of the important object.

When a plurality of objects are included in an image, the image processing device 100 may identify an important object in the image by using various methods. For example, the image processing device 100 may identify, among the plurality of objects, an object that appears most often in a video including the image as an important object. Alternatively, the image processing device 100 may identify a currently speaking object as an important object. Alternatively, the image processing device 100 may identify an object located in the center of the image and having a size larger than a reference value as an important object.

In an embodiment, the image processing device 100 may identify an object selected by a user as an important object. For example, when a plurality of objects are detected from an image, the image processing device 100 may output pieces of object identification information respectively indicating the detected objects around the objects. The user may select one of the plurality of pieces of object identification information to correspond to the object identification information output on the screen. The image processing device 100 may identify an object corresponding to object identification information selected by a user as an important object.

In an embodiment, the image processing device 100 may obtain control information for image quality processing. In an embodiment, the control information may be information indicating a user control command for image quality processing of an important information. The control information may include control information of at least one of whether and how much an important object is to be enlarged, outline processing, or flattening processing.

In an embodiment, the image processing device 100 may perform image quality processing on the important object according to the control information.

In an embodiment, the image processing device 100 may perform image quality processing on the important object so that a user with visual impairment may better recognize content.

In an embodiment, for image quality processing, at least one of upscaling of an object, outline processing around the object, and flattening processing inside the object may be performed.

In an embodiment, the control information may include at least one of inference control information and real-time user control information.

In an embodiment, the inference control information may denote control information inferred by considering tendencies of people with visual impairment or users.

In an embodiment, the inference control information may be obtained by general cognitive characteristics or preferences of people with visual impairment. Although it may vary depending on the degree of visual impairment, in general, people with visual impairment tend to want to see important objects larger, prefer to omit detailed expressions inside objects, and prefer images with the outlines of objects more clearly emphasized. Accordingly, by considering the cognitive characteristics or preferences of people with visual impairment, the image processing device 100 may infer control information of how to perform processing regarding whether to enlarge an important object included in an image currently output on the screen, i.e., the first image 101 in FIG. 1, outline processing, detail processing, etc.

In some cases, users may have tastes or preferences that are somewhat different from those of people with visual impairment in general. Accordingly, in an embodiment, the inference control information may be obtained based only on the past history of users who use the image processing device 100, rather than those with visual impairment. The image processing device 100 may accumulate information about what control command the user gave when an image was output, and may infer the user's preferences and taste from this.

Alternatively, in an embodiment, the inference control information may be obtained based on information about user preference that is pre-input by the user using the image processing device 100.

In an embodiment, the real-time user control information may denote control information of the user for an image currently output on the screen. The real-time user control information may be distinguished from the inference control information in that the real-time user control information represents real-time control information of the user for the first image 101 currently output on the screen. The user may wish to control important objects included in the first image 101 differently from the past. For example, the user may wish to view an important object included in the first image 101 enlarged, unlike before. In this case, the user may input user control information to the image processing device 100 in real time by using a remote controller, etc. The image processing device 100 may receive real-time user control information from the user and accordingly, upscale the important object larger and output the object.

In an embodiment, the image processing device 100 may obtain a second image 103, which is obtained by performing image quality processing on the important object from the first image 101.

In an embodiment, the image quality processing may include at least one of outline processing of an important object, flattening processing inside the important object, and upscaling the important object.

In an embodiment, the image processing device 100 may obtain the second image 103 from the first image 101 by using artificial intelligence (AI). The AI technology may be composed of machine learning (deep learning) and element technologies using machine learning. The AI technology may be implemented by using an algorithm. Here, an algorithm or set of algorithms for implementing AI technology may be referred to as a neural network. The neural network may receive input data and perform calculation for analysis and classification, to output result data.

In an embodiment, the image processing device 100 may perform image quality processing on an important object included in the first image 101 by using a neural network.

In an embodiment, the neural network may be a neural network that has learned an input image, an object area of interest to the user in the input image, control information of the user about quality processing, and a ground truth image obtained by processing the object area of interest to the user, as a learning data set.

In an embodiment, the neural network may obtain the second image 103 obtained by performing image quality processing on the important object, from at least one of the first image 101, the control information, and the object information.

In an embodiment, the neural network may obtain the second image 103 by performing at least one of upscaling of an important object, displaying a thickness of an object outline thicker, processing a color of the object outline in a specific color, or performing a flattening process inside the object.

In an embodiment, when the entire first image 101 is selected as an important object and image quality processing is performed thereon, the second image 103 may be an image obtained by performing image quality processing on the entire first image 101. Alternatively, image quality processing is performed only on an important object area, not the entire first image 101, the second image 103 may be an image including only the important object area on which the image quality processing is performed. Alternatively, in the second image 103, image quality processing is performed only on an important object area in the first image, and the second image 103 may be the same as the first image 101 in terms of the remaining area other than the important object area.

In an embodiment, the neural network may obtain flattening parameters and outline parameters for image quality processing on an object, from the first image 101, user control information, or object information. The image processing device 100 may obtain a second image on which image quality processing is performed by receiving selection of a control signal for blending between the parameters from a user and accordingly, adjusting a degree of blending between an image processed according to the flattening parameters and an image processed according to the outline parameters.

Alternatively, in another embodiment, the neural network may also obtain, as a result, a second image for which image quality processing is performed by obtaining flattening parameters and outline parameters for image quality processing on an object and then, automatically adjusting a degree of blending between the flattening parameters and the outline parameters.

As described above, according to an embodiment, the image processing device 100 may perform image quality processing on an important object according to user characteristics. The image processing device 100 may render an important object included in an image based on object information of the important object and control information for image quality processing. Accordingly, the user may view an image obtained by performing image quality processing on an important object area of interest, so that viewing satisfaction with the image may be improved.

However, this is only an example, and an image processing module may not be included in the image processing device 100 and may be implemented as a separate device from the image processing device 100. In other words, the image processing device 100 may communicate with an external device or server including an image quality processing module through a communication network (not shown). In this case, the image processing device 100 may transmit a video to the external device or server through the communication network. In addition, the image processing device 100 may transmit a control command to the external device or server. The external device or server may receive a video including a plurality of frames from the image processing device 100, and detect an important object area from an image by using an image quality processing module. The image quality processing module may perform image quality processing according to the control command on the important object area. The image quality processing module may perform image quality processing on the important object included in the frames by using a neural network. The external device or server may transmit the image after image quality processing back to the image processing device 100 through the communication network. The image processing device 100 may output the image after image quality processing through a screen.

As described above, according to an embodiment, the image processing device 100 may output, to a user, an image obtained by performing image quality processing on the important object area in the video.

Figure 2:
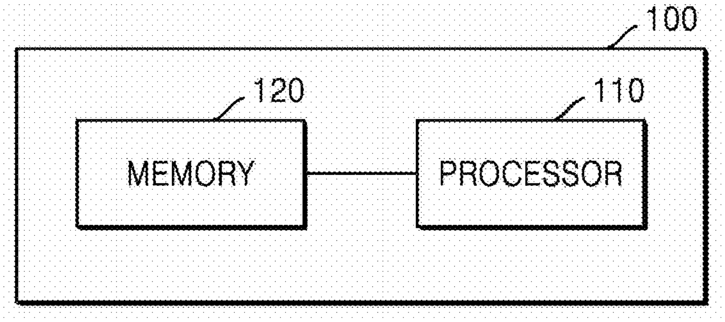
FIG. 2 is an internal block diagram of an image processing device according to an embodiment.

FIG. 2 is an internal block diagram of the image processing device 100 according to an embodiment.

The image processing device 100 shown in FIG. 2 may be the image processing device 100 in FIG. 1.

In an embodiment, the image processing device 100 may include at least one of desktop computers, smartphones, tablet personal computers (PCs), mobile phones, video phones, e-book readers, laptop PCs, netbook computers, digital cameras, personal digital assistants (PDAs), portable multimedia players (PMPs), camcorders, navigations, wearable devices, smart watches, home network systems, security systems, and medical devices.

The image processing device 100 may be implemented not only as a flat display device, but also as a curved display device including a screen having a curvature or a flexible display device in which a curvature may be adjusted. An output resolution of the image processing device 100 may have various resolutions such as high definition (HD), full HD, ultra HD, or a clearer resolution than Ultra HD.

The image processing device 100 may output a video. The video may include a plurality of frames. The video may include television programs provided by contents providers or items such as various movies or dramas through a video on demand (VOD) service. The contents providers may denote terrestrial broadcasting stations or cable broadcasting stations providing various items of content including a video to users, over-the-top (OTT) service providers, or Internet Protocol television (IPTV) service providers.

Referring to FIG. 2, the image processing device 100 may include a processor 110 and a memory 120.

The memory 120 according to an embodiment may store at least one instruction. The memory 120 may store at least one program to be executed by the processor 110. In the memory 120, at least one neural network and/or predefined operation rules or AI model may be stored. In addition, the memory 120 may store data input to or output from the image processing device 100.

The memory 120 may include storage media of at least one type from among a flash memory type, a hard disk type, a multimedia card micro type, a card-type memory (e.g., Secure Digital (SD) or eXtreme Digital (XD) memory, etc.), random access memory (RAM), static random access memory (SRAM), read-only memory (ROM), electrically erasable programmable read-only memory (EEPROM), programmable read-only memory (PROM), magnetic memory, magnetic disks, or optical disks.

In an embodiment, in the memory 120, one or more instructions for performing image processing may be stored.

In an embodiment, in the memory 120, one or more instructions for obtaining object information of an important object included in an image may be stored.

In an embodiment, in the memory 120, one or more instructions for obtaining control information for image quality processing may be stored.

In an embodiment, in the memory 120, one or more instructions for performing image quality processing on an important object based on the object information and the control information may be stored.

In an embodiment, in the memory 120, at least one neural network and/or predefined operation rules or AI model may be stored.

In an embodiment, the neural network stored in the memory 210 may be a neural network that has learned an input image, an object area of interest to the user in the input image, and a ground truth image obtained by processing the object area of interest to the user, as a learning data set.

In an embodiment, the neural network stored in the memory 120 may obtain a second image by performing image quality processing on an important object area from the first image.

The processor 110 may control an overall operation of the image processing device 100. The processor 110 may execute the one or more instructions stored in the memory 120 to control the image processing device 100 to function.

In an embodiment, the processor 110 may obtain, from an image, object information of an important object included in the image.

In an embodiment, when the number of objects included in the image is plural number, the processor 110 may identify, as an important object, an object appearing most often from among the plurality of objects, a currently speaking object, or an object positioned in an area of interest.

Alternatively, in an embodiment, the processor 110 may allow object identification information indicating the plurality of objects to be output on the screen, and identify, as an important object, an object corresponding to the object identification information selected by the user.

In an embodiment, the processor 110 may obtain control information for image quality processing.

In an embodiment, the processor 110 may obtain an image quality processed image obtained by performing image quality processing on an important object based on the object information and the control information.

In an embodiment, the processor 110 may perform, by using the neural network, image quality processing on the important object from at least one of the first image, the control information, and the object information.

In an embodiment, the neural network may perform at least one of upscaling of the important object, outline processing around the important object, and a flattening process of the inside of the important object.

Figure 3A:
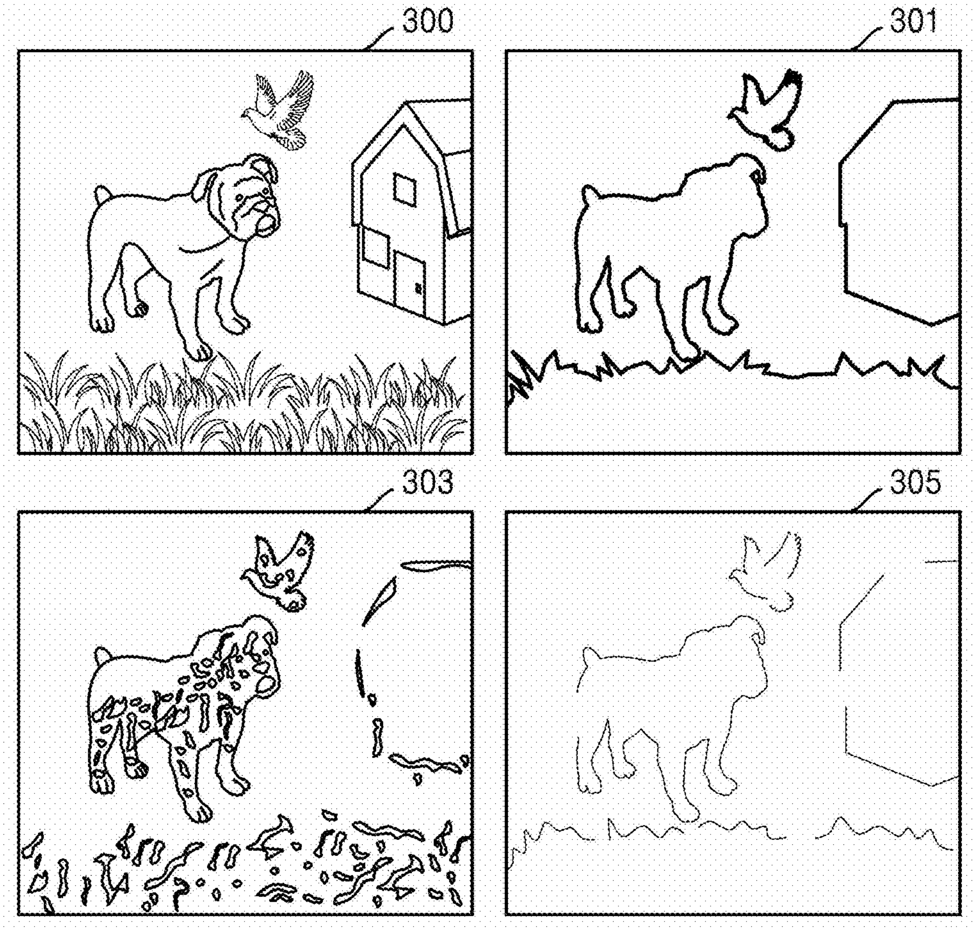
FIGS. 3A and 3B are diagrams for describing that a user inputs visual impairment information by using an image processing device, according to an embodiment.
Figure 3B:
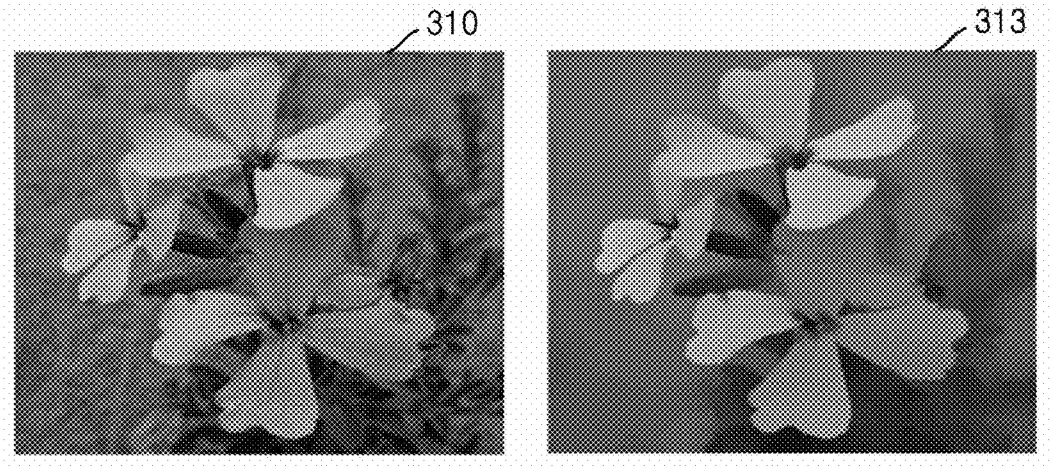

FIGS. 3A and 3B are diagrams for describing inputting of visual impairment information by a user using the image processing device 100, according to an embodiment.

In an embodiment, to provide a viewing assistance function, the image processing device 100 may identify a degree of visual impairment of the user in advance. When the image processing device 100 obtains inference control information by using the neural network, it takes time for the neural network to identify the user's interaction history. In other words, until the neural network becomes an optimized model through training, reliable control information cannot be inferred. Accordingly, the image processing device 100 may train a learning model more quickly based on the visual impairment information input by the user, thereby obtaining more reliable inference control information in a short time.

In an embodiment, the image processing device 100 may allow a user with visual impairment to directly input visual impairment information, to identify a degree of visual impairment of the user.

Alternatively, in an embodiment, the image processing device 100 may identify the degree of visual impairment of the user by providing an example screen to the user and allowing the user to select a preferred example.

In an embodiment, when the user selects that the viewing assistance function is activated, the image processing device 100 may show various images to the user to identify the degree of visual impairment of the user. The user may provide a user interaction while watching an effect image to which various functions are applied, provided by the image processing device 100. For example, the user may input information about image quality processing preferred by the user regarding an object size, outline processing, and flattening processing, etc.

FIG. 3A shows that the image processing device 100 outputs a plurality of images 301, 303, and 305 generated by performing outline processing on a first basic image 300 and objects included in the first basic image 300.

In an embodiment, with respect to the outlines of the objects included in the first basic image 300, depending on whether to keep the outlines, whether to process texture inside the objects, whether to eliminate noise, an intensity of the outlines, and a degree of detail of the outlines, etc., the image processing device 100 may variously modify the outlines of the objects included in the first basic image 300. The intensity of the outlines may denote a degree of thickness or darkness of the outlines.

The user may view the plurality of images 301, 303, and 305 shown in FIG. 3A and select an easily recognizable image or an image having an outline preferred by the user among the images.

The image processing device 100 may store information about outline processing performed on the image selected by the user and use the information as inference control information for future outline processing on an object included in the image.

Users with visual impairment tend to prefer that outlines or shapes of objects to be preserved rather than fine details included in an image. In an embodiment, the image processing device 100 may receive, from the user, selection of a degree to remove details inside an object, i.e., a degree of flattening. Flattening the inside of an object may denote removing texture or detailed expressions inside the object so that the inside of the object is blurred or crushed. When the degree of flattening is large, it may denote that more texture or detailed expressions are removed so that the inside of the object is more crushed.

The image processing device 100 may perform a flattening process on a second basic image 310 according to a flattening degree selected by the user and output the result image to the user.

FIG. 3B shows that the image processing device 100 outputs an image 313 obtained by performing flattening processing on the second basic image 310 and objects included in the second basic image 310 according to the flattening degree selected by the user.

Referring to FIG. 3B, unlike in the second basic image 310, in the image 313 obtained by performing flattening processing, it can be identified that a texture or pattern inside a petal has been removed.

The user may view the image 313 obtained by performing flattening processing to confirm the flattening degree or reselect the flattening degree. When the user reselects the flattening degree, the image processing device 100 may reperform flattening processing on the second basic image 310 according to the flattening degree selected by the user and output the result image to the user.

The image processing device 100 may store information about the flattening degree selected by the user, and use the information as inference control information. When image quality processing is performed on an image in the future, the image processing device 100 may perform flattening on an object included in the image by using the information about the flattening degree selected by the user.

Although not shown in FIGS. 3A and 3B, in an embodiment, the image processing device 100 may receive a selection from the user as to what size to enlarge an important object included in a basic image. The image processing device 100 may store information about a degree of enlargement selected by the user, and by using the information as inference control information, upscale an important object to a size selected by the user when image quality processing is performed on an important object included in the image in the future.

As described above, according to an embodiment, the image processing device 100 may receive input of a degree of visual impairment or preference from the user, and generate control information based on the information input from the user.

Figure 4:
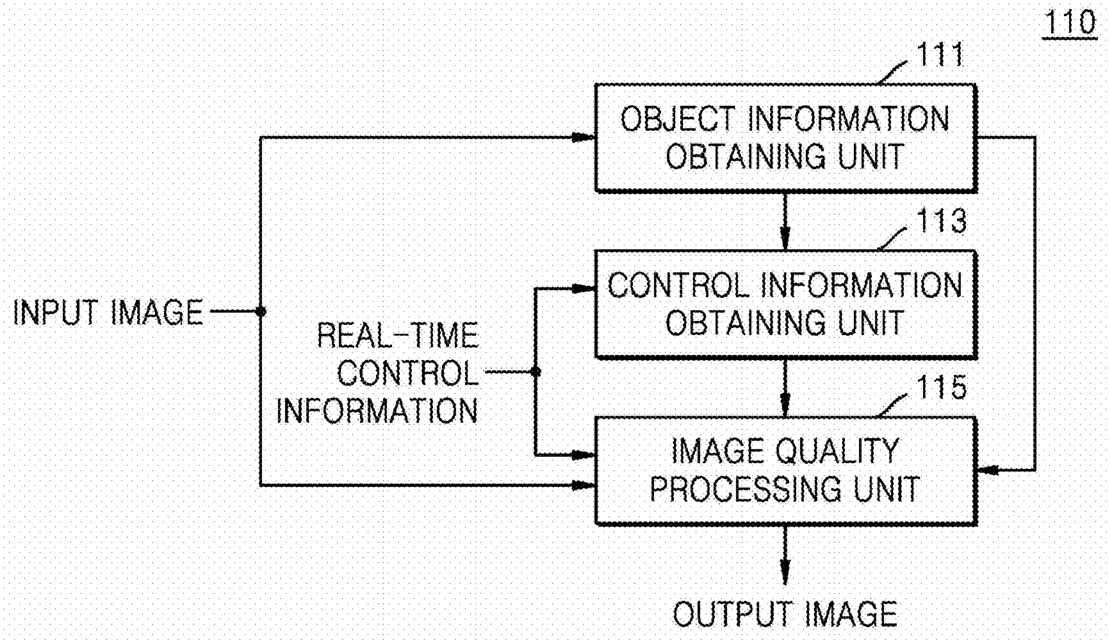
FIG. 4 is an internal block diagram of a processor in FIG. 2, according to an embodiment.

FIG. 4 is an internal block diagram of the processor 110 in FIG. 2, according to an embodiment.

Referring to FIG. 4, the processor 110 may include an object information obtaining unit 111, a control information obtaining unit 113, and an image quality processing unit 115.

In an embodiment, the object information obtaining unit 111, the control information obtaining unit 113, and the image quality processing unit 115 may be included in the processor 110 in a module form. The module may denote a functional and structural combination of hardware for performing the technical concept of the present disclosure with software for driving the hardware. For example, the module may denote a logical unit of a code and a hardware resource for the code to be performed, and does not necessarily denote a physically connected code or is limited to one type of hardware.

In an embodiment, the object information obtaining unit 111 may detect an object by analyzing an input image, and obtain object information of the object.

In an embodiment, the object information may include information about at least one of a type, location, and size of an important object.

The important object is an object of interest, and thus may mainly be located in an area of interest that attracts the user's attention. The area of interest may vary depending on visual characteristics of the user, etc. For example, people tend to see a central portion of the screen more often than an edge portion, and thus, in general, the central portion of the screen may be an area of interest. In addition, people generally tend to consider objects located in the foreground more important than objects located in the background. In addition, people tend to focus more on moving objects than stationary objects.

In an embodiment, the object information obtaining unit 111 may identify an object located in a central area of an input image as an important object.

In an embodiment, the object information obtaining unit 111 may identify an object in the foreground as an important object rather than an object in the background.

In an embodiment, the object information obtaining unit 111 may consider whether an object is moving based on a plurality of frames and identify an object that moves more as an important object rather than a stationary object.

When only one object is included in the input image, the object information obtaining unit 111 may identify the one object as an important object.

When a plurality of objects are included in the input image, the object information obtaining unit 111 may identify an important object from among the plurality of objects. The important object may be a part of the plurality of objects included in the input image. The important object may be in singular number, but is not limited thereto, and may be in plural number depending on a type or characteristics of the image, a user's selection, etc.

The area of interest may vary depending on a type of the image. In an embodiment, the object information obtaining unit 111 may analyze the input image and identify a genre of the input image. In an embodiment, the object information obtaining unit 111 may differently identify the area of interest depending on the genre of the input image.

For example, when the image is of a genre such as a drama or movie, users tend to view a main character or a current speaker with interest, and thus, the main character or the current speaker may be an important object. In addition, when a person appears in an image, people have a strong desire to recognize a shape of a person's face included in the image, and thus, the face area may be identified as an area of interest.

In an embodiment, when an input image is a movie or drama, the object information obtaining unit 111 may identify a character appearing most often in the input image as an important object. Alternatively, in an embodiment, the object information obtaining unit 111 may identify a speaker from a movement of an object included in the image, for example, a movement of lips included in a face, and identify the speaker as an important object.

When the input image is news, users tend to pay close attention to subtitles displayed at the bottom of the news screen. Accordingly, in an embodiment, when a genre of the input image is news, or the input image includes subtitles, the object information obtaining unit 111 may identify a bottom area of the screen or an area including the subtitles as an area of interest, and identify characters included in the area of interest as an important object.

In an embodiment, the object information obtaining unit 111 may obtain information about a type of an important object or a class to which an object belongs as object information.

In an embodiment, the object information may include information about a location of an important object. For example, the object information may include information about whether the important object is located in the center of the screen, at the bottom of the screen, or at the upper right of the screen, etc. A location of the important object may be obtained by using coordinate values within the screen, etc.

In an embodiment, the object information may include information about a size of the important object. The size of the important object may denote a proportion of the important object in the image, a horizontal or vertical length of the important object, or a diagonal length or diameter of the important object, etc.

In an embodiment, the object information obtaining unit 111 may transmit the object information to the control information obtaining unit 113 and the image quality processing unit 115.

In an embodiment, the control information obtaining unit 113 may obtain control information.

In an embodiment, the control information may include at least one of inference control information and real-time user control information.

In an embodiment, the inference control information may denote control information inferred by considering tendencies of people or users with visual impairment.

The inference control information may be control information obtained by inferring how to perform image quality processing on an important object included in an image to be output on a current screen according to the tendencies of people with visual impairment and/or users.

In an embodiment, the control information obtaining unit 113 may obtain the inference control information based on cognitive characteristics or preferences of people with visual impairment. For example, the control information obtaining unit 113 may pre-store information about cognitive characteristics of people with visual impairment. The control information obtaining unit 113 may infer control information of an input image to be output on the current screen based on the pre-stored information about the cognitive characteristics of people with visual impairment.

People with visual impairment may have unique visual characteristics to people with visual impairment in addition to general visual characteristics of people with no visual impairment in general. For example, people with visual impairment tend to focus on an overall outline of an object or a component within the object rather than focusing on the details of the entire image. In addition, people with visual impairment tend to view only a specific object in a larger size rather than viewing the entire image together. In addition, people with visual impairment tend to pay close attention to objects with high color contrast. For example, when there is an image of a red maple leaf falling on a green lawn, people with visual impairment have a strong desire to view objects with high color contrast in more detail. Accordingly, the control information obtaining unit 113 may obtain control information preferred by people with visual impairment as inference control information.

In an embodiment, the control information obtaining unit 113 may obtain inference control information from the interaction history of the user. The user may have tastes or preferences that are somewhat different from those of people with visual impairment. In general, people with visual impairment often use the image processing device 100 alone. In other words, people with visual impairment often use the image processing device 100 as a personalized device. Accordingly, the image processing device 100 may infer preferences or tastes of the user based on the control command history input by the user for image quality processing of an object.

The control information obtaining unit 113 may link the user's control history with an image and accumulate which control command the user gave when an image is output, and infer preferences or tastes of the user therefrom. The control information obtaining unit 113 may accumulate in time-series the user's control command history in the past input for a plurality of frames or a plurality of videos and identify a pattern of the user control command, and infer preferences or tastes of the user therefrom.

The control information obtaining unit 113 may consider the user's control history together with the cognitive characteristics and preferences of people with normal visual impairment and infer an image quality processing command for an important object. Alternatively, the control information obtaining unit 113 may infer an image processing command for an important object by considering only the user's control history and excluding the cognitive characteristics of people with normal visual impairment.

Alternatively, in an embodiment, the control information obtaining unit may obtain inference control information based on information about user preference, pre-input by the user using the image processing device 100. The user may use the image processing device 100 to pre-input information about a degree of visual impairment of the user or a degree of image quality processing preferred by the user. The image processing device 100 may obtain inference control information by inferring control information to be applied to a current image from the pre-input information about the user preference.

In an embodiment, the control information obtaining unit 113 may receive an input of real-time user control information from the user. The real-time user control information may denote user's real-time control information for an input image currently output on the screen. The control information obtaining unit 113 may update pre-stored control information by using the real-time user control information input from the user. In an embodiment, the control information obtaining unit 113 may transmit the updated control information to the image quality processing unit 115.

In an embodiment, the image quality processing unit 115 may receive object information from the object information obtaining unit 111 and receive control information from the control information obtaining unit 113.

In an embodiment, the image quality processing unit 115 may obtain, based on the object information and the control information, a second image by performing image quality processing on an important object.

In an embodiment, the image quality processing unit 115 may perform outline processing on the important object. The outline processing of the important object may include performing processing on at least one of a detail of the outline, an intensity of the outline, a color of the outline, and a degree of contrast between the outline and other areas.

In an embodiment, the image quality processing unit 115 may perform flattening processing on the inside of the important object. The flattening processing may include processing to adjust the degree of flattening of an internal area of the important object excluding the outline of the important object.

In an embodiment, the image quality processing unit 115 may upscale the important object. The image quality processing unit 115 may not only increase a size of the important object, but also perform clarity processing on the important object. In other words, through the upscaling of the important object, the image quality processing unit 115 may improve a resolution while increasing the size of the important object.

In an embodiment, the image quality processing unit 115 may, based on information about a genre, location, and size of the important object, obtained from the object information, identify a target on which image quality processing is to be performed, match control information to an identified area, and perform image quality processing on the identified area according to the control information.

For example, the image quality processing unit 115 may obtain information about the important object being subtitle, a location of the subtitle being the bottom of the screen, and how much the size of the subtitle occupies in the image. Based on the control command for image quality processing obtained from the control information, the image quality processing unit 115 may identify a subtitle area and perform image quality processing on the subtitle area. For example, the image quality processing unit 115 may find the location of the subtitle, crop an area including the subtitle, and upscale the cropped area to a certain size. The image quality processing unit 115 perform image quality processing on the important object by performing processing to display the borders of the subtitles in purple, the user's preferred color, thick and dark above a certain intensity.

Figure 5:
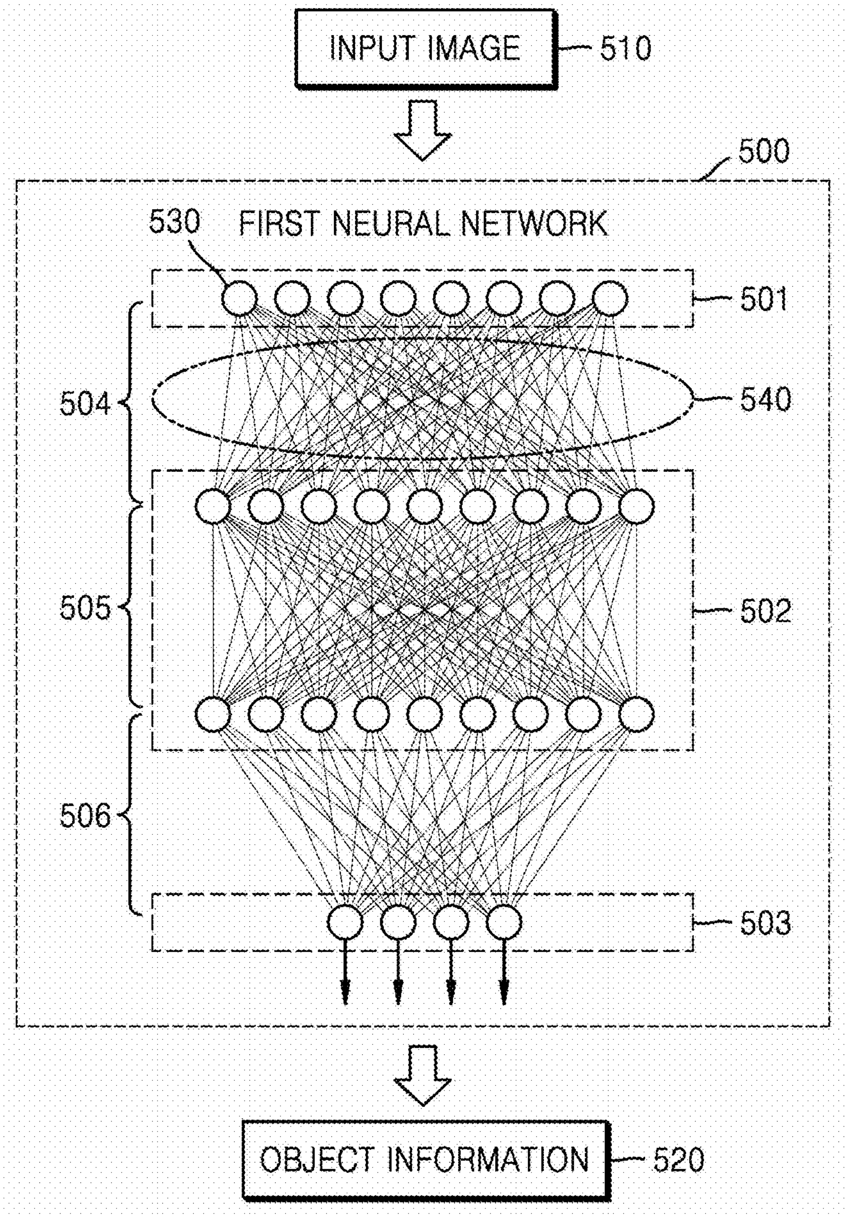
FIG. 5 is a diagram for describing that an object information obtaining unit obtains object information from an input image, according to an embodiment.

FIG. 5 is a diagram for describing that the object information obtaining unit 111 obtains object information from an input image, according to an embodiment.

In an embodiment, the object information obtaining unit 111 may include appropriate logic, circuits, interfaces, and/or code capable of performing a function of obtaining an object information 520 from an input image 510. In an embodiment, the object information obtaining unit 111 may analyze the input image 510 in a rule-based manner and obtain the object information of an object included in the input image 510. When data processing performance, operating system, central processing speed (CPU) processing speed, etc. of the image processing device 100 are such that it is difficult to perform a large amount of calculation in a short time, the object information obtaining unit 111 may be designed to analyze the input image 510 in a rule-based manner and obtain object information from the input image 510.

Alternatively, in an embodiment, the object information obtaining unit 111 may obtain the object information 520 from the input image 510 by using a neural network. In an embodiment, a neural network included in the object information obtaining unit 111 is referred to as a first neural network 500.

In an embodiment, the first neural network 500 may be a deep neural network (DNN) including two or more hidden layers. The first neural network 500 may include a structure in which input data is received, the input data passes through the hidden layers and processed, and the processed data is output.

In FIG. 5, a case is shown as an example in which a hidden layer of the first neural network 500 is a deep neural network (DNN) having two depths.

The object information obtaining unit 111 may analyze the input image 510 by performing calculation through the first neural network 500. The first neural network 500 may perform learning through learning data. Here, the first neural network 500 may be designed in many different ways depending on an implementation method of a model or an accuracy of the result, reliability of the result, calculation processing speed and capacity of a processor, etc.

The first neural network 500 may include an input layer 501, a hidden layer 502, and an output layer 503, and perform calculations for genre determination and object detection. The first neural network 500 may be formed of layer 1 504 formed between the input layer 501 and hidden layer 1, layer 2 505 formed between hidden layer 1 and hidden layer 2, and layer 3 506 formed between hidden layer 2 and the output layer 503.

Each of the plurality of layers forming the first neural network 500 may include one or more nodes. For example, the input layer 501 may include one or more nodes 530 for receiving data. In FIG. 5, a case where the input layer 501 includes a plurality of nodes is shown as an example. In addition, the input image 510 may be input to the plurality of nodes 530. Here, as shown, two adjacent layers may be connected by using a plurality of edges (e.g., 540). Each of the nodes has a corresponding weight value, and thus, the first neural network 500 may obtain output data based on a value obtained by calculating, for example, multiplying an input signal and a weight value.

The first neural network 500 may be learned based on a plurality of learning data and constructed as a model for inferring the object information 520 from the input image 510.

In an embodiment, the first neural network 500 may be a neural network trained by learning a certain dataset by a method such as supervised learning. The neural network may be trained to detect an object information area that is equal or similar to the learned dataset.

In an embodiment, the first neural network 500 may be an algorithm for extracting features by analyzing and classifying input data with a plurality of learning data as input values. The first neural network 500 may be a model trained to extract object information from the input data. To this end, the first neural network 500 may learn a method of detecting an important object from an image. The first neural network 500 may be trained by using images of various genres and a label of each of the images, a type, location, or size of an important object included in each of the images as a learning data set.

In an embodiment, the first neural network 500 may analyze an object that people consider important in an image, and analyze a type of the object. More specifically, the first neural network 500 may train, as learning data, information about an important object for which people with visual impairment uses a highlight function in the image, and a type of the object.

In an embodiment, the first neural network 500 may learn a saliency dataset to find an area of interest. The saliency dataset may also be referred to as a saliency map. The saliency map may refer to a map in which a saliency area that attracts people's attention is distinguished from other areas. In an embodiment, the first neural network 500 may learn information about a saliency area in which people with visual impairment are mainly interested. The saliency area may indicate an area that attracts the attention of people with visual impairment, that is, an area with high visual concentration. For example, the first neural network 500 may be a model that has pre-learned a saliency area obtained by tracking the eyes of people with visual impairment. The first neural network 500 may be trained to obtain a saliency map for an input video frame, based on color change or distribution, edges, spatial frequency, structure distribution, histogram, texture, etc. of a pixel group including each of pixels included in the input video frame or a plurality of pixels having similar features. In an embodiment, the first neural network 500 may obtain object information of an important object by assigning a high weight to a saliency map area.

In an embodiment, the first neural network 500 may learn a segmentation data set as learning data in addition to the saliency data set. The first neural network 500 may identify a type of an important object included in an image by considering semantic information of the object. The first neural network 500 obtain object information of the important object by assigning different weights according to the type of the important object.

In addition, the first neural network 500 may be trained by using an image understanding dataset as learning data. The first neural network 500 may learn what an object is and in addition, a spatial relationship between objects, etc. by interpreting an object or an area of the object. The first neural network 500 may obtain object information of an important object according to an image understanding data set.

In an embodiment, the first neural network 500 may learn an image and a label of each image, information about whether the image uses image quality processing, for example, a highlight function, for people with visual impairment, and information about an object obtained by performing image quality processing, for example, highlighting, on the image. In an embodiment, the first neural network 500 may be trained to learn a relationship between an image in which people with visual impairment use the highlight function and the object information of the quality-processed object, and obtain object information from the image.

In an embodiment, the first neural network 500 may be trained by using a type of an object on which people with visual impairment performs image quality processing, or an area including the object as a correct answer set. The first neural network 500 may be repeatedly trained to infer/ predict a type, location, or size of the object from an input image and allow the predicted result to match the correct answer set.

Specifically, in order to improve the accuracy of a result output through the first neural network 500, training may be repeatedly performed in a direction toward the input layer 501 from the output layer 503 based on a plurality of learning data, and weight values may be modified so that the accuracy of the output result is improved.

In addition, the first neural network 500 having weight values that are finally modified may use the object information as a model. Specifically, the first neural network 500 may analyze information included in the input image 510, which is input data, and output the object information 520 as a result.

The first neural network 500 that has completed learning may be mounted on the object information obtaining unit 111 and used to obtain the object information 520 from the input image 510. When the input image 510 is input, the first neural network 500 may detect a label of the input image 510 and an important object included in the input image therefrom, and obtain object information including information about at least one of a type, location, and size of the important object.

In an embodiment, the object information obtaining unit 111 may transmit the object information obtained by using the first neural network 500 to the control information obtaining unit 113 and the image quality processing unit 115.

In an embodiment, object information transmitted to the control information obtaining unit 113 by the object information obtaining unit 111 and object information transmitted to the image quality processing unit 115 may be different from each other. When the object information that the object information obtaining unit 111 to the control information obtaining unit 113 is first object information, the first object information may be information obtained from the input image 510, that is, one frame. Because the control information obtaining unit 113 obtains control information from a correlation between a genre of an image and a user control command, the object information obtaining unit 111 may transmit, to the control information obtaining unit 113, only information about a genre of a frame, obtained from each frame. For example, the first object information may include only information about a genre of the input image 510, for example, information about whether the input image 510 is news, drama, etc.

In an embodiment, when the object information that the object information obtaining unit 111 transmits to the image quality processing unit 115 is second object information, the second object information may include information obtained by analyzing not only the input image 510, but also a plurality of frames or video including the input image 510. According to the genre of the input image 510, the second information may include information about a genre of an important object within an identified area of interest and a location or size of the important object. Because the image quality processing unit 115 performs image quality processing on an important object included in the input image 510, information such as a type, location, and size of the important object is necessary. Accordingly, in an embodiment, the object information obtaining unit 111 may analyze a video including the input image 510, obtain object information of an important object therefrom, and transmit the information to the image quality processing unit 115. For example, when the genre of the input image 510 is news, the second object information may include information indicating that a genre of the important object is subtitles, information about a location of subtitles in the input image 510, information about a size of subtitles, etc.

However, this is only an example, and the object information that the object information obtaining unit 111 transmits to the control information obtaining unit 113 and the object information transmitted to the image quality processing unit 115 may be the same information. For example, the object information obtaining unit 111 may transmit, to both the control information obtaining unit 113 and the image quality processing unit 115, a genre of an image and object information, that is, information about a type, location, and size of the object.

Figure 6:
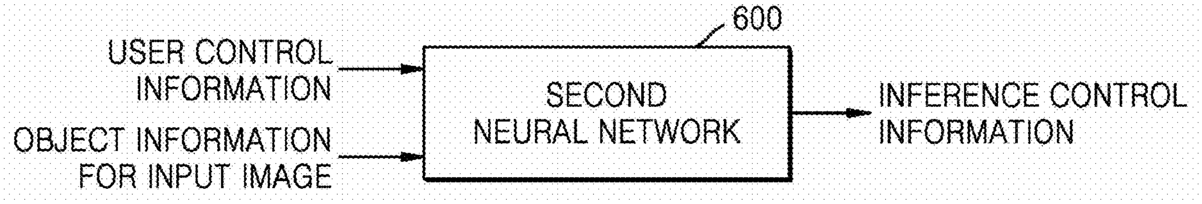
FIG. 6 is a diagram for describing that a control information obtaining unit obtains inference control information, according to an embodiment.

FIG. 6 is a diagram for describing that the control information obtaining unit 113 obtains inference control information, according to an embodiment.

In an embodiment, the control information obtaining unit 113 may include an appropriate logic, circuit, interface, and/or code capable of performing a function of obtaining inference control information from input data.

In an embodiment, the control information obtaining unit 113 may infer control information of an input image from user control information and object information of the input image by using various algorithms.

In an embodiment, the control information obtaining unit 113 may infer control information based on rules such as programs or instructions, or obtain infer control information by using a neural network.

In an embodiment, FIG. 6 shows a case in which the control information obtaining unit 113 obtains inference control information by using a neural network. When a neural network included in the control information obtaining unit 113 is referred to as a second neural network 600, in an embodiment, the second neural network 600 may learn interaction history of a user with an important object.

In an embodiment, the second neural network 600 may be implemented as a recurrent neural network (RNN).

In an embodiment, the second neural network 600 may learn information about image quality processing mainly used for a specific image by people with visual impairment. The second neural network 600 may be trained by using, as learning data, a type, control degree, control frequency, etc. of a control command input in relation to image quality processing of an image by people with visual impairment. In a state in which the second neural network 600 has learned data of existing data of people with visual impairment in general, when a type, control degree, control frequency, etc. of a control command input in relation to image quality processing of an image by a user of the image processing device 100 are additionally learned, the second neural network 600 may be a semi-supervised learning algorithm.

Alternatively, in another embodiment, the second neural network 600 may learn only a type, control degree, control frequency, etc. of a control command input in relation to image quality processing of an image by the user of the image processing device 100. In this case, the second neural network 600 may be an unsupervised learning algorithm, in which a pattern of the user is learned by using the user's own interaction history.

In an embodiment, the user's interaction history may include control information history for at least one of outline processing, flattening processing, and upscaling processing for an important object. A user's interaction may be input through a user interface such as a remote controller or keypad provided in the image processing device 100.

In an embodiment, the second neural network 600 may accumulate user interaction history and learn preference, habit, use pattern, etc. of the user therefrom. The user interaction history may include history of at least one of a type of an image selected by a user to receive image quality processing, a type of an object subject to image quality processing in the image, an object size, an object location, a type or degree of image quality processing selected by the user, and information about a time point at which an image quality processing function is used.

The type or degree of image quality processing selected by the user may include information about an outline thickness or details of an object requested by the user, a color of the outline, and a flattening degree inside the object, information about to what size the object is enlarged, etc. The information about the time point at which the image quality processing function is used may include information such as whether a user uses the image quality processing function before video reproduction, or whether the image quality processing function is only used after the video is reproduced, after a certain time has elapsed, or a specific image is output.

In an embodiment, when a user inputs a new control command, the second neural network 600 may additionally learn the control command of the user.

In an embodiment, the second neural network 600 may receive object information of an input image from the object information obtaining unit 600. The object information of the input image may include information about a type of the input image.

In an embodiment, the second neural network 600 may receive an input of user control information for the corresponding image.

In an embodiment, the second neural network 600 may identify a type of the input image from the object information of the input image, and learn, by using the user control information for the input image, information about whether the user has used an image quality processing function for the input image and information about which control command the user has given for the input image.

In an embodiment, the second neural network 600 may statistically learn the user interaction history and output inference control information from the obtained use pattern. The inference control information may be control information obtained by inferring which image quality processing is to be performed on a current image based on the user's interaction history. The control information obtained from the second neural network 600 may be transmitted to the image quality processing unit 115.

Figure 7:
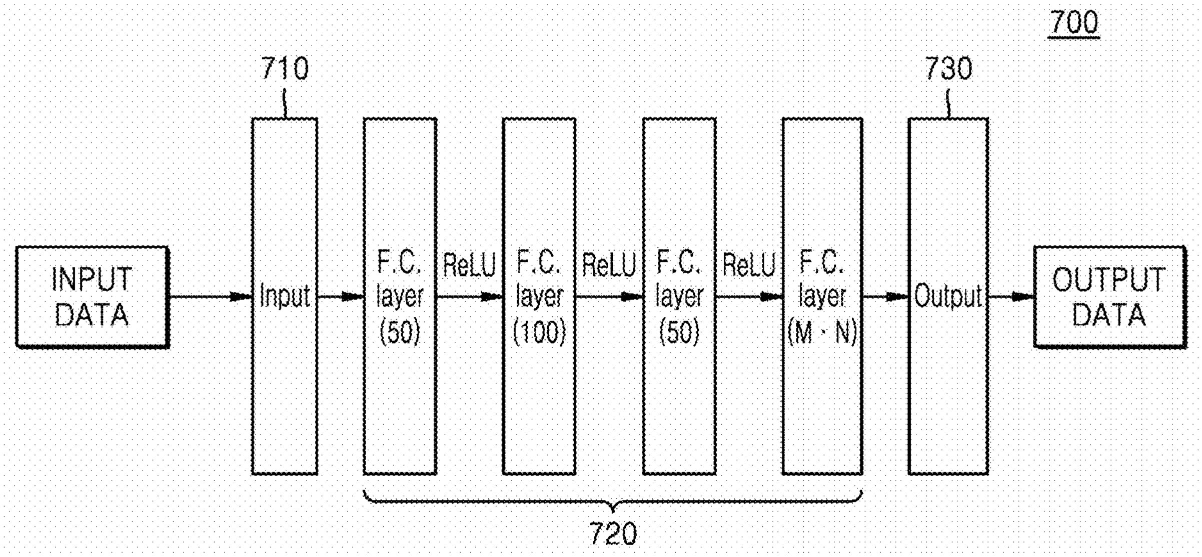
FIG. 7 is a diagram for describing that an image quality processing unit obtains, from an input image, a quality-processed output image, according to an embodiment.

FIG. 7 is a diagram for describing that the image quality processing unit 115 obtains a quality-processed output image from an input image.

Referring to FIG. 7, the image quality processing unit 115 may obtain output data from input data by using a neural network.

When the neural network used by the image quality processing unit 115 is referred to as a third neural network 700, in an embodiment, the third neural network 700 may be a neural network based on a convolution neural network (CNN), deep convolution neural network (DCNN), or Caps-Net.

In an embodiment, the third neural network 700 may receive an input of various data and may be trained to find or obtain, on its own, a method of analyzing input data, a method of classifying the input data, and/or a method of extracting a feature necessary for generating result data from the input data. The third neural network 700 may be created into an artificial intelligence model with desired characteristics by applying a learning algorithm to a plurality of learning data. Such learning may be performed in the image processing device 100 itself or may be performed through an additional server/system. Here, the learning algorithm is a method of training a certain target device (e.g., a robot) by using the plurality of learning data to allow the certain target device may make decisions or perform predictions on its own.

In an embodiment, the third neural network 700 may be trained as a data interference model through supervised learning with learning data as input values.

Referring to FIG. 7, the third neural network 700 may include an input layer 710, a hidden layer 720, and an output layer 730. In an embodiment, the hidden layer 720 may include a plurality of hidden layers. The third neural network 700 may include one or more hidden layers. For example, the third neural network 700 may be a deep third neural network (DNN) 700 including two or more hidden layers. The deep neural network (DNN) is a neural network that performs calculations through a plurality of layers, and a depth of the network may increase depending on the number of internal layers performing the calculations. The DNN calculation may include a CNN calculations, etc.

In the third neural network 700, the hidden layer 720 may be formed of a plurality of layers between the input layer 710 and the output layer 730. The depth and shape of layers of the third neural network 700 may be variously designed by considering accuracy of a result, reliability of the result, a speed and capacity of calculation processing of a processor, etc.

Each of the plurality of layers forming the third neural network 700 may include one or more nodes. For example, the input layer 710 may include one or more nodes for receiving data. Here, the number of nodes included in the input layer 710 of the third neural network 700 may be the same as the number of nodes included in the output layer 730. In FIG. 7, a case is shown in which the number of nodes of first hidden layers included in the third neural network 700 is 50, the number of nodes of the second hidden layer is 100, and the number of nodes of the third hidden layer is 50. However, this is only an example, and the number of nodes of the third neural network 700 may be variously designed.

In an embodiment, input data may be input to a plurality of nodes included in the input layer 710.

People with visual impairment may not recognize high frequency textures and thus may not need such images. Because people with visual impairment place more importance on recognizing large outlines of large objects, it is necessary to generate an image in which a size of an important object is large, the inside of the important object is flat, and an outline of the important object is highlighted.

Accordingly, in an embodiment, the third neural network 700 may use, as learning data, images of various genres, object information of an area or object in which people with visual impairment are interested in each of the images, control information input for image quality processing by people with visual impairment, and a correct answer set reflecting visual characteristics of people with visual impairment.

In an embodiment, the third neural network 700 may receive object information from the object information obtaining unit 111 and receive control information from the control information obtaining unit 113. The third neural network 700 may receive an input of images having various genres, object information obtained for each of the images by the object information obtaining unit 111, and control information obtained by the control information obtaining unit 113 as input data.

Nodes of two adjacent layers may be connected by using a plurality of edges. Each of the edges may have a corresponding weight value and calculation information such as multiplication or addition. The third neural network 700 may perform calculations by multiplying or adding a weight value of edge by or to a weight of an edge, and output the result value as a node value of a next layer connected to the edge. In an embodiment, layers included in the third neural network 700 may be formed of a fully connected layer, in which every node of a previous layer are connected to every node of a next layer.

The third neural network 700 allows values input to nodes to pass through a function and then transfers the values to a next layer, and at this time, a function for determining an output of the next layer is referred to as an activation function. The activation function may be a function for determining how to transfer input data to a next layer. In an embodiment, the third neural network 700 may use a rectified linear unit (ReLU) as an activation function used by a hidden layer. The ReLU is one of a non-linear activation function and has advantages of quick learning and simple implementation. However, the disclosure is not limited thereto, and the third neural network 700 may use other non-linear activation functions such as Sigmoid or Hyperbolic tangent/Tang function. Alternatively, the third neural network 700 may use a binary activation function or linear activation function as an activation function instead of a non-linear function.

In an embodiment, the third neural network 700 may receive an input of input data by using nodes included in the input layer 710, perform calculations between each of the layers for the input data, and obtain the result values as output data. In other words, the third neural network 700 may analyze and classify the input data and extract and process features necessary for performing image quality processing, to obtain result data after image quality processing as output data.

In an embodiment, the third neural network 700 may identify an important object area for the input image based on object information. In an embodiment, the third neural network 700 may perform at least one of outline processing for an important object, flattening processing of the inside of the important object, and upscaling the important object based on user control information, to perform image quality processing on the important object area.

In an embodiment, the third neural network 700 may obtain parameters for image quality processing for an object from at least one of images having various genres, user control information, and object information. The parameters for image quality processing may include at least one of flattening parameters, outline parameters, or upscaling parameters.

In an embodiment, the third neural network 700 may adjust a parameter value by using the user control information, and allow an important object to be image quality processed accordingly.

In an embodiment, the third neural network 700 may perform outline processing on the important object according to the outline parameters. The third neural network 700 may determine, based on the user control information, to what degree details of the outline of the important is to be maintained, an intensity of the outline, that is, a degree of thickness or darkness, a color of the outline, a degree of color contrast between a background area and a color of the outline, etc.

In an embodiment, the third neural network 700 may perform flattening processing on the inside of the important object according to the flattening parameters. The third neural network 700 may perform a processing to adjust a flattening degree of an inner area of the important object except for the outline of the important object by using a method preferred by a user according to the user control information.

In an embodiment, the third neural network 700 may upscale the important object according to the upscaling parameters. The third neural network 700 may enlarge a size of the important object to a size preferred by the user according to the user control information. At the same time, the third neural network 700 may perform clarity processing on the enlarged important object.

In an embodiment, the third neural network 700 may upscale the size of the important object by generating a new pixel between pixels instead of simply copying a size of pixels to increase the number of pixels. The third neural network 700 may generate a new pixel by various methods. The third neural network 700 may generate a new pixel between pixels by various upsampling methods such as a nearest method, bilinear method, a joint bilateral method, etc. In other words, the third neural network 700 may perform a processing to increase the size of the important object while adjusting a resolution of the important object, to increase the size of the important object and improve the resolution.

In an embodiment, the third neural network 700 may learn a blending degree of a result of application of the flattening parameters and a result of application of the outline parameters based on the user control information. The third neural network 700 may learn a blending degree preferred by a user by learning control information, and accordingly blend results of application of the flattening parameters and the outline processing, so that a final product may be obtained in which the inside of the important object may be flattened and the outline of the important object is outline-processed.

In another embodiment, instead of obtaining a result of image quality processing for the important object, the third neural network 700 may output the flattening parameters and the outline parameters for the important object as output data. In this case, the image quality processing unit 115 may additionally receive, from a user, an input of a result of application of the flattening parameters and a result of application of the outline parameters. When the user feels that the flattening degree is too intense and the outline processing is too weak, blending information of the flattening parameters and the outline parameters may be adjusted by using a user interface. The image quality processing unit 115 may adjust the blending degree of parameters according to a control signal from the user and obtain a final quality-processed image.

In an embodiment, in order to improve the accuracy of a result, the third neural network 700 may repeatedly perform training in a direction toward the input layer 710 from the output layer 730 based on a plurality of learning data, and modify weight values to improve the accuracy of the output result.

In an embodiment, the third neural network 700 may obtain a difference between the result data of image quality processing, output from the output layer 730 and a ground truth as a loss function. The ground truth may be data obtained by performing image quality processing on an important object that the user is interested in according to an image quality processing method preferred by the user. The third neural network 700 may receive an input of a loss function again and continuously modify weight values of edges included in a hidden layer, that is, the hidden layer 720, so as to minimize the loss function. The weight values of the edges may be optimized through repeated training and may be repeatedly modified until the accuracy of the result satisfies certain reliability. The third neural network 700 may be formed by finally-set weight values of the edges.

According to an embodiment, an operation of learning a method of performing image quality processing on an important object included in an image by using the third neural network 700 may be pre-performed before the image processing device 100 is mounted. When some of a plurality of learning data are changed, a learning model may also be updated. When new learning data is used or added in a certain cycle, the third neural network may re-learn, from the new learning data, a method of performing image quality processing, and accordingly, the learning model may be updated.

In an embodiment, an operation of learning a method of performing image quality processing by using the third neural network 700 may be performed by an external computing device (not shown). An operation of learning a method of performing image quality processing on an object included in an image by using the third neural network 700 may require a relatively complex calculation amount. Accordingly, the computing device may perform a learning operation, and the image processing device 100 may receive a learning model from the computing device through a communication network. Alternatively, a manufacturer manufacturing the image processing device 100 may mount the third neural network 700 trained by the computing device on the image processing device 100, so that the learning model may be used to obtain a quality-processed by the image processing device 100.

Alternatively, in another embodiment of the disclosure, the image processing device 100, rather than a computing device, may directly perform a learning operation through the third neural network 700. In this case, the image processing device 100 may obtain learning data, train the third neural network 700 by using the learning data and determine the learning model, and obtain a quality-processed image through the determined learning model.

In an embodiment, the third neural network 700 which has completed training may receive an input of a real-time image, object information, and control information as input data. The third neural network 700 may receive an input of object information from the object information obtaining unit 111 for an input image input in real time. The third neural network 700 may identify a type, location, or size of an important object in a real-time image based on the object information. The third neural network 700 may receive control information to be applied to the real-time image, generated based on the user's interaction history from the control information obtaining unit 113, and according to the control information, perform image quality processing on the important object included in the real-time image to obtain an image in which the important object is quality-processed as output data.

Figure 8A:
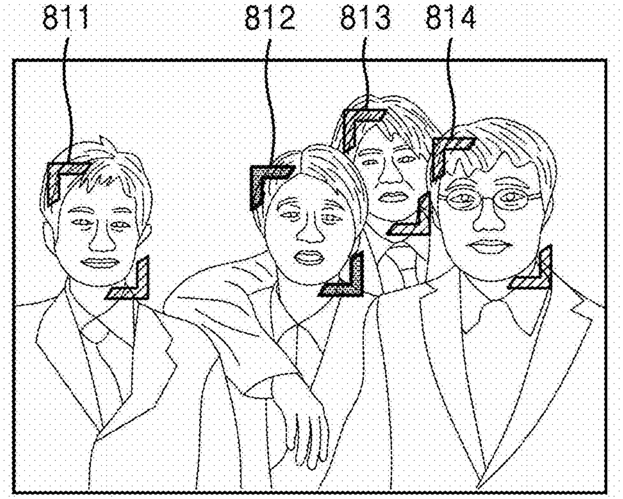
FIGS. 8A, 8B, and 8C are diagrams for describing that an image processing device receives selection of an important object from a user, according to an embodiment.
Figure 8B:
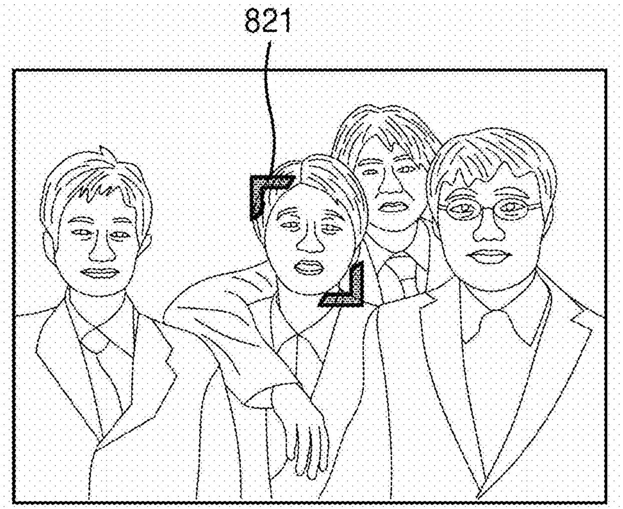
Figure 8C:
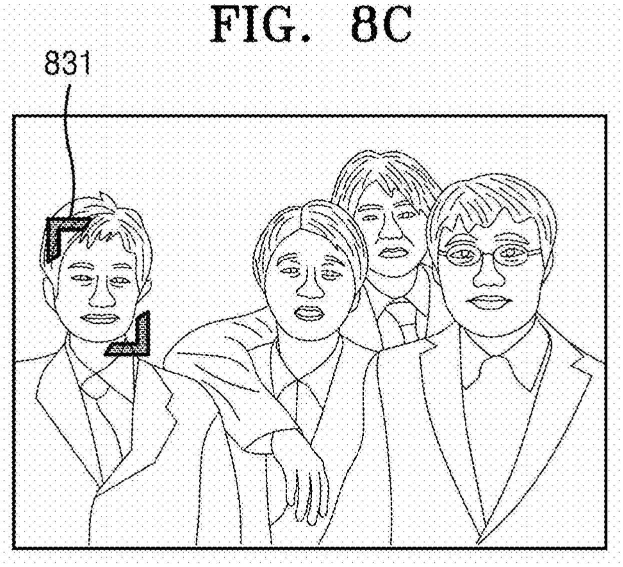

FIGS. 8A, 8B, and 8C are diagrams for describing that the image processing device 100 receives selection of an important object from a user, according to an embodiment.

In an embodiment, the image processing device 100 may detect an object in an input image. When a plurality of objects are included in the input image, the image processing device 100 may identify an important object from among the plurality of objects. The important object may be some of the plurality of objects included in the input image.

In an embodiment, the image processing device 100 may receive, directly from a user, selection of an object to be processed as an important object from among the plurality of objects. To this end, the image processing device 100 may output object identification information for identifying each of the plurality of objects around the plurality of objects, respectively.

FIGS. 8A, 8B, and 8C show that when a plurality of objects are detected in an image, the image processing device 100 outputs object identification information to a screen to receive selection as to which object among the objects is determined as an important object from a user.

FIG. 8A shows that when an image currently output to the screen is a still image, the object identification information is output to the screen. The image processing unit 100 may output, when a user is to view a video, a still image including a plurality of characters appearing in the corresponding video, and output object identification information to the still image. The image processing device 100 may output object identification information 811, 812, 8123, and 814 for each of the plurality of objects around the objects. A user may select one of the plurality of pieces of object identification information by using a user interface such as a remote controller. For example, when the user selects the object identification information 812, the image processing device 100 may display a color, thickness, transparency, etc. of the object identification information 812 selected by the user differently from other pieces of object identification information, to notify the user that a specific object is selected.

FIGS. 8B and 8C are diagrams illustrating that the image processing device 100 identifies a speaker while a video is reproduced, and outputs object identification information corresponding to the speaker around the speaker. The image processing device 100 may analyze a currently-output image and identify a speaker in the image. For example, when an object included in the currently-reproduced video is a person, the image processing device 100 may analyze the person's face and identify an object whose lips are moving as the speaker. Alternatively, the image processing device 100 may receive an input of a video frame and an audio frame together, analyze and classify features of the input video frame and audio frame, and identify a location of the current speaker, to detect the speaker.

FIG. 8A illustrates that the image processing device 100 outputs, around the speaker, object identification information 821 for indicating a speaker at a specific time point, for example, a t0 time point. A user may select the object identification information 821 around the speaker by using a remote controller, etc., so that the speaker may be identified as an important object.

When the user does not select the object identification information 821 output at the t0 time point by the user, the image processing device 100 may output, on the screen at a t1 time point, object identification information 831 for displaying a speaker other than the speaker at the t0 time point. FIG. 8C illustrates that the image processing device 100 outputs the object identification information 831 for indicating the speaker at the t1 time point on the screen. The user may select the object identification information 831 output to the screen at the t1 time point, to select an object corresponding to the object identification information 831 output at the t1 time point as an important object.

As described above, according to an embodiment, the image processing device 100 may receive, directly from a user, selection of an important object on which image quality processing is to be performed from among a plurality of objects. Accordingly, the image processing device 100 may perform image quality processing on the important object selected by the user, so that a target desired by the user may be better recognized by the user.

Figure 9:
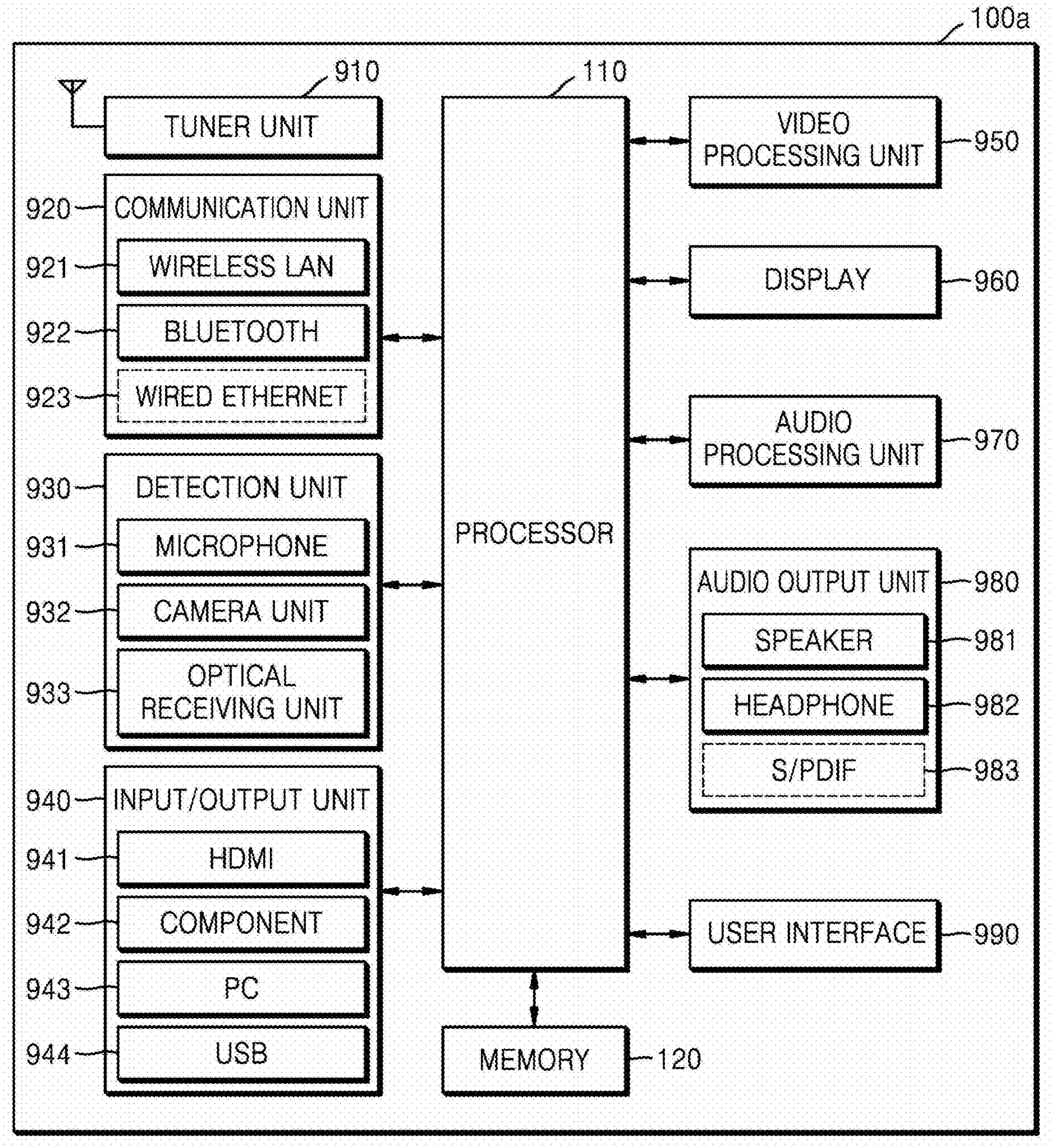
FIG. 9 is an internal block diagram of an image processing device according to an embodiment.

FIG. 9 is an internal block diagram of an image processing device 100*a* according to an embodiment.

The image processing device 100*a* of FIG. 9 may be an example of the image processing device 100 of FIG. 2. Hereinafter, descriptions overlapping those of FIG. 2 are omitted.

Referring to FIG. 9, the image processing device 100*a* may further include a tuner unit 910, a communication unit 920, a detection unit 930, an input/output unit 940, a video processing unit 950, a display unit 960, an audio processing unit 970, an audio output unit 980, and a user interface 990 in addition to the processor 110 and the memory 220.

The tuner unit 910 may tune and select, through amplification, mixing, resonance, etc. of wirelessly-received broadcasting content, only a frequency of a channel to be received by the image processing device 100 from among various radio wave components. Content received through the tuner unit 910 may be decoded and separated into audio, video, and/or additional information. The separated audio, video, and/or additional information may be stored in the memory 220 by the control of the processor 110.

The communication unit 920 may connect the image processing device 100*a* to peripheral devices or external devices, servers, mobile terminals, etc. by the control of the processor 110. The communication unit 920 may include at least one communication module capable of performing wireless communication. The communication unit 920 may include at least one of a wireless local area network (LAN) module 921, a Bluetooth module 920, and a wired Ethernet 923 to correspond to performance and structure of the image processing device 100*a*.

The Bluetooth module 922 may receive a Bluetooth signal transmitted from a peripheral device according to a Bluetooth communication standard. The Bluetooth module 922 may be a Bluetooth Low Energy (BLE) communication module and may receive a BLE signal. The Bluetooth module 922 may continuously or temporarily scan a BLE signal to detect whether a BLE signal is received. The wireless LAN module 921 may transmit and receive Wi-Fi signals to and from peripheral devices according to a Wi-Fi communication standard.

The detection unit 930 may detect user's voice, user's image, or user's interaction, and may include a microphone 931, a camera unit 932, an optical receiving unit 933, and a sensing unit 934. The microphone 930 may receive ab audio signal including a speech uttered by a user or noise, and convert the received audio signal into an electrical signal and output the signal to the processor 110.

The camera unit 932 may include a sensor (not shown) and a lens (not shown) and may capture an image formed on a screen and transmit the image to the processor 110.

The optical receiving unit 933 may receive optical signals (including control signals). The optical receiving unit 933 may receive optical signals corresponding to a user input (e.g., touch, press, touch gesture, speech, or motion) from a control device such as remote controllers or cell phones.

The input/output unit 940 may receive a video (e.g., dynamic image signals or still image signals, etc.), audio (e.g., speech signal, music signal, etc.), and additional information, etc. from an external device, etc. of the image processing device 100 by the control of the processor 110.

The input/output unit 940 may include one of a high-definition multimedia interface port (HDMI) 941, a component jack 942, a personal computer (PC) port 943, or a universal serial bus (USB) port 944. The input/output unit 940 may include a combination of the HDMI port, the component jack 942, the PC port 943, the USB port 944.

The video processing unit 950 may process image data to be displayed by the display unit 960 and perform various image processing operations such as decoding, rendering, scaling, noise filtering, frame rate conversion, and resolution conversion, etc. of image data.

In an embodiment, the video processing unit 950 may perform image quality processing on an important object according to control information. The video processing unit 950 may perform image quality processing such as increasing a size of the important object, converting a resolution, flattening the inside of the important object, processing the outline of the important object, etc.

The display unit 960 may output, to a screen, content received from a broadcasting station or received from an external server or external storage media, etc. The content is a media signal and may include video signals, images, text signals, etc.

In an embodiment, the display unit 960 may output an image in which an important object is quality-processed by the video processing unit 950 to the screen.

In an embodiment, the display unit 960 may output a screen including object identification information around an object.

In an embodiment, the display unit 960 may output an interface screen for receiving selection of a viewing assistance function from a user.

The audio processing unit 970 may perform processing on audio data. The audio processing unit 970 may perform various processing such as decoding, amplification, noise filtering of audio data.

The audio output unit 980 may output, by the control of the processor 110, audio included in content received through the tuner 910, audio input through the communication unit 920 or the input/output unit 940, and audio stored in the memory 220. The audio output unit 980 may include at least one of a speaker 981, headphones 982, and a Sony/Philips Digital Interface (S/PDIF: output terminal) 983.

The user interface 990 may receive a user input for controlling the image processing device 100*a*. The user interface 990 may include user input devices of various types, including touch panels for detecting a user's touch, buttons for receiving a user's push manipulation, wheels for receiving a user's rotary manipulation, keyboards, dome switches, microphones for speech recognition, motion detection sensors for sensing motion, etc., but is not limited thereto. When a remote controller or mobile terminals control the image processing device 100*a*, the user interface 990 may receive control signals received from the mobile terminals.

In an embodiment, the user interface 990 may receive, from a user, selection of whether an image quality processing function is to be used. In an embodiment, the user interface 990 may receive selection as to which function among the image quality processing functions is used and to what degree.

In an embodiment, the user interface 990 may receive selection of object identification information on a screen from a user.

Figure 10:
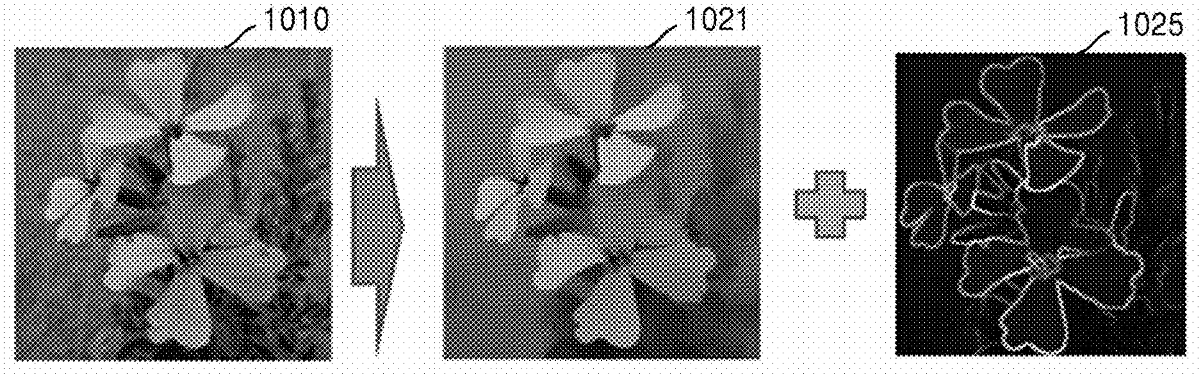
FIG. 10 is a diagram for describing image quality processing performed on an input image by an image processing device, according to an embodiment.

FIG. 10 is a diagram for describing image quality processing performed on an input image by the image processing device 100, according to an embodiment.

Referring to FIG. 10, the image processing device 100 may receive an input of an input image 1010, and process each and obtain a first processing image 1021 and a second processing image 1025.

In an embodiment, the image processing device 100 may adjust a flattening degree inside an object included in the input image 1010. The image processing device 100 may determine, according to the user's interaction history or real-time control information, to what degree details inside the object included in the input image 1010 are to be deleted. The image processing device 100 may obtain flattening parameters for image quality processing for an important object from at least one of an image, user control information, and control information by using the third neural network 700. The flattening parameters may be parameters indicating a degree of flattening processing.

In an embodiment, the image processing device 100 may perform flattening processing on the inside of an object included in the input image 1010 by using various filters. For example, the image processing device 100 may adjust a degree of blurring of details inside the object included in the input image 1010 by using an edge preserving smoothing filter.

In an embodiment, the image processing device 100 may adjust a flattening degree of an important object by adjusting flattening parameters based on the user control information.

In an embodiment, the first processing image 1021 shows an image obtained by performing flattening on objects included in the input image 1010. When the first processing image 1021 is viewed, it can be understood that all detailed expressions such as patterns inside petals, stamens, and pollen have disappeared and been crushed flat.

In an embodiment, the image processing unit 100 may process outlines of objects included in the input image 1010. In an embodiment, the image processing device 100 may obtain outline parameters for image quality processing for an important object from at least one of an image, user control information, and object information by using the third neural network 700. The outline parameters may be parameters for a degree of preservation of an outline, removal of surrounding noise, thickness of the outline, whether or not details of the outline are removed, etc.

In an embodiment, the image processing device 100 may process an outline of an important object by adjusting the outline parameters based on the user control information.

In an embodiment, the second processing image 1025 shows an image in which outlines of the objects included in the input image 1010 are processed. When the second processing image 1025 is viewed, it can be understood that only a shape of a petal is included as a thick outline, and all other detailed expressions have been removed. In addition, it can be understood that a color of the outline is different from those of the background or the inside of the object.

In an embodiment, the third neural network 700 included in the image processing device 100 may learn a degree of blending of a flattening-processed image and an outline-processed image based on the user control information. The third neural network 700 may learn the blending degree preferred by a user by learning the user control information, and accordingly blend an image to which the flattening parameters are applied and an image to which the outline parameters are applied, to obtain a final product in which the inside of an important object is flattened, and the outline of the important object is outline-processed. In other words, in FIG. 10, the third neural network 700 may automatically adjust the blending degree of the first processing image 1021 and the second processing image 1025, and accordingly obtain a final image.

In another embodiment, the image processing device 100 may receive, from a user, a control command with respect to a blending degree of an image to which flattening parameters are applied and an image to which outline parameters are applied.

In an embodiment, the image processing device 100 may adjust the blending degree between the images to which the flattening parameters and the outline parameters are applied and adjust a level of the flattening degree and a level of outline processing, to obtain a final product.

In this case, the third neural network 700 may output the first processing image 1021 obtained by performing only flattening processing on an important object and the second processing image 1025 obtained by performing only outline processing as output data, rather than outputting a result of performing image processing on the important object as output data.

The image processing device 100 may receive, from a user, an additional input of blending information between an image obtained by performing only flattening processing and an image obtained by performing only outline processing. When the user feels that the flattening degree is too intense and the outline processing is too weak, the blending degree between the image obtained by flattening processing and the image obtained by outline processing may be adjusted by using a user interface. The image quality processing unit 115 may adjust the blending degree between images according to a control signal from a user and obtain a final quality-processed image.

Figure 11A:
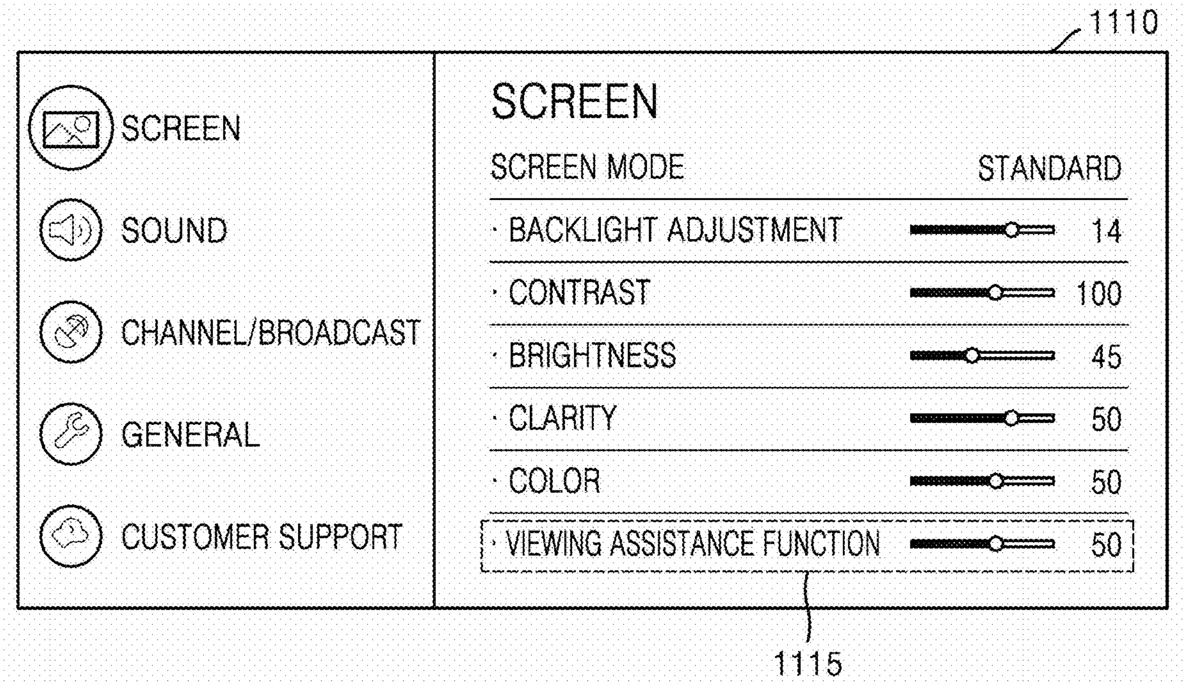
FIGS. 11A and 11B are diagrams illustrating a user interface screen including an image quality processing function, according to an embodiment.
Figure 11B:
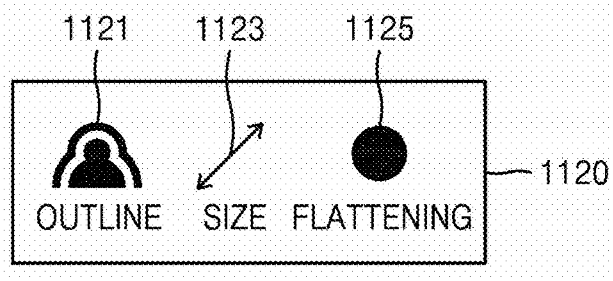

FIGS. 11A and 11B are diagrams illustrating a user interface screen including an image quality processing function, according to an embodiment.

A user may select a viewing assistance function in advance before viewing an image and select whether image quality processing is to be performed or a degree of image quality processing. Alternatively, when a user desires to perform image quality processing on a specific object while viewing the image, the user may perform selection such that the viewing assistance function is activated, so that image quality processing is performed on the specific object in real time.

The image processing device 100 may output an interface screen for providing the viewing assistance function. In an embodiment, the image processing device 100 may output a screen setting interface screen for setting various functions of the screen from among various setting functions.

Referring to FIG. 11A, a screen setting interface screen 1110 may include a menu 1115 for selecting a viewing assistance function. The menu 1115 for selecting the viewing assistance function may include a menu bar in a bar shape for adjustment of whether to apply the viewing assistance function or a degree of application of the viewing assistance function. However, this is only an example, and the screen setting interface screen 1110 and the menu for selecting the viewing assistance function 1115 may have various structure, arrangements, and shapes.

FIG. 11B illustrates an example of another screen setting interface screen 1120. The other screen setting interface 1120 may include a menu for outline processing 1121, a menu for size adjustment 1123, and a menu for flattening processing 1125. A user may view the other screen setting interface screen 1120 and select a type of image quality processing to be performed on an important object.

In addition, although not shown in FIGS. 11A and 11B, when a user selects a type of image quality processing, the image processing device 100 may output a user interface screen for inputting information regarding to what degree of the selected type of image quality processing is to be performed. A user may select and output outline processing, a degree of flattening, and a degree of enlargement.

Figure 12:
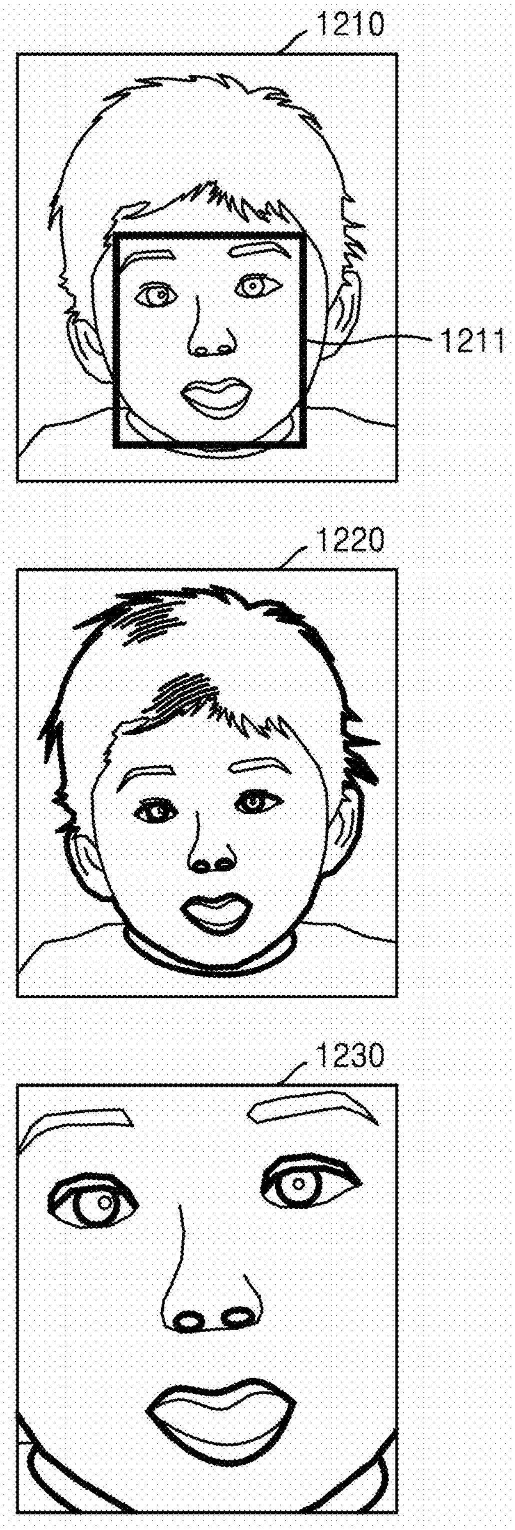
FIG. 12 is a diagram illustrating a result image obtained by performing image quality processing on an input image by an image processing device, according to an embodiment.

FIG. 12 is a diagram illustrating a result image obtained by performing image quality processing on an input image by the image processing device 100, according to an embodiment.

Referring to FIG. 12, the image processing device 100 may analyze an input image 1210 and detect an important object included in the input image 1210. The image processing device 100 may analyze the important object and identify that the important object is a person.

In an embodiment, the image processing device 100 may perform image quality processing on the person as a whole. The image processing device 100 may perform only flattening and outline processing of an object while maintaining a size of the object without enlarging the object, based on user's control information, that is, according to user's past history or taste. For example, the image processing device 100 may identify, based on the user interaction history, that the user has not used an enlargement function when a size of the important object is a certain size or greater, determine whether to use the enlargement function depending on the size of the object included in the input image 1210. When the size of the object is greater than the certain size, the image processing device 100 may only perform another image quality processing without enlarging the object included in the input image 1210.

In an embodiment, the image processing device 100 may flatten the entire object, process the outline thereof, and obtain a first result image 1220. It can be understood that an object included in the first result image 1220 has the same size as the object in the input image 1210. In addition, it can be understood that the object included in the first result image 1220 is obtained by performing outline and flattening processing on the object included in the input image 1210.

Alternatively, in another embodiment, when the object included in the input image 1210 is a person, the image processing device 100 may identify only the person's face as an important object. For example, when the user prefers to enlarge and view a person's face based on the user interaction history, the image processing device 100 may identify only a person's facial area 1211 of the input image 1210 as an important object area. The image processing device 100 may crop the facial area, which is the important object area, and perform image quality processing on the cropped important object area. The image processing device 100 may enlarge the cropped important object area to a size of the input image 1210 and simultaneously, adjust a resolution of the important object area. In addition, the image processing device 100 may perform flattening processing and outline processing preferred by the user on the important object area.

In an embodiment, the image processing device 100 may perform image quality processing only on the important object and obtain a second result image 1230. It can be understood that the second result image 1230 includes only a facial area of the object included in the input image 1210. In addition, it can be understood that an outline of the face of the object included in the input image 1210 is processed, and the remaining areas within the face other than the eyes, the nose, and the mouth are flattened.

Figure 13:
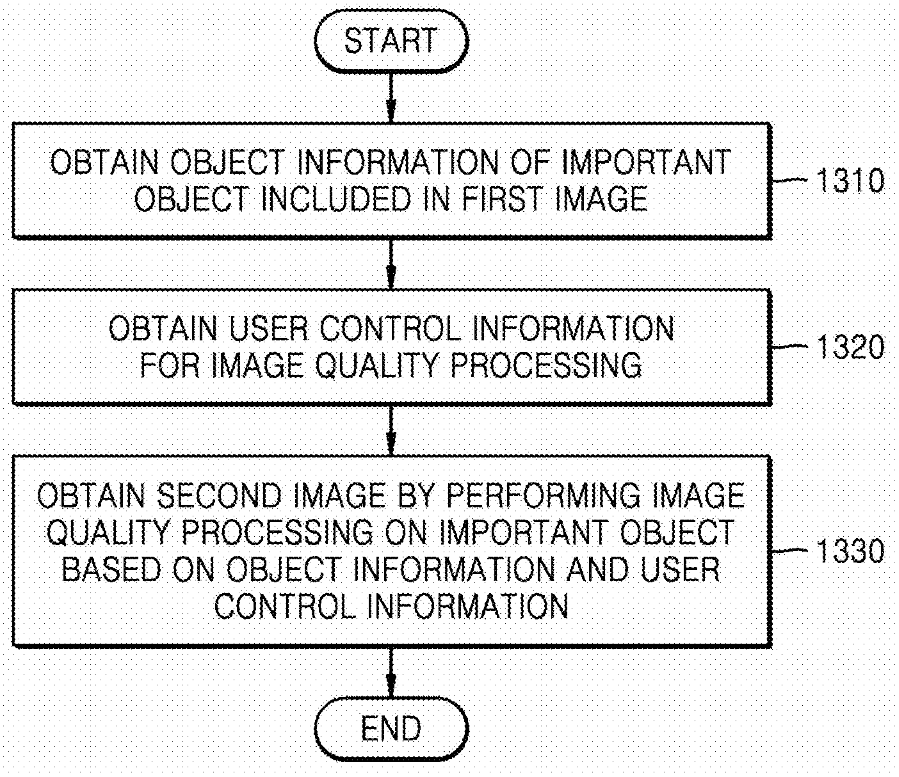
FIG. 13 is a flowchart illustrating a method of obtaining, from a first image, a second image obtained by performing image quality processing on an important object, according to an embodiment.

FIG. 13 is a flowchart illustrating a method of obtaining a second image from a first image by performing image quality processing on an important object, according to an embodiment.

Referring to FIG. 13, the image processing device 100 may receive an input of the first image and obtain object information of the important object included in the first image (operation 1310).

In an embodiment, the image processing device 100 may analyze the first image and detect the important object from the first image. The image processing device 100 may obtain information about at least one of a type, location, and size of the important object as the object information.

In an embodiment, the image processing device 100 may obtain user control information for image quality processing (operation 1320).

In an embodiment, the user control information may include control information of at least one of whether to enlarge the object, a degree of enlargement of the object, outline processing, and flattening processing.

In an embodiment, the image processing device 100 may perform image quality processing on the important object based on the object information and the control information and obtain the second image (operation 1330).

In an embodiment, image quality processing for the object included in the first image may be performed by referring to the user's control information regarding the location, size, and type of the object obtained based on the object information of the image processing device 100.

Figure 14:
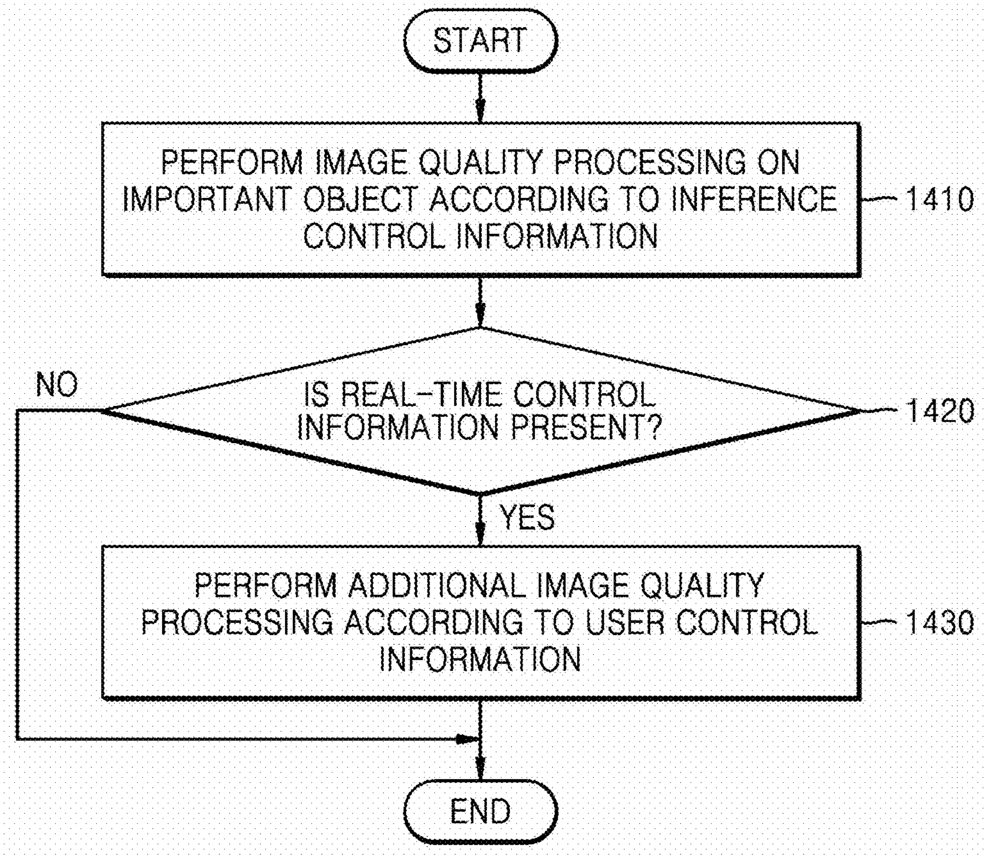
FIG. 14 is a flowchart illustrating that image quality processing is performed according to user control information, according to an embodiment.

FIG. 14 is a flowchart illustrating performance of image quality processing according to user control information, according to an embodiment.

In an embodiment, the user control information may include at least one of inference control information and real-time user control information.

In an embodiment, the image processing device 100 may obtain the inference control information based on user's interaction history pre-stored within the image processing device 100.

In an embodiment, the image processing device 100 may perform image quality processing on an important object according to the inference control information.

In an embodiment, the image processing device 100 may identify whether real-time control information of a user is received (operation 1420).

In an embodiment, when the user's real-time control information is input, the image processing device 100 may additionally perform image quality processing on the object according to the real-time control information (operation 1430). When the user's real-time control information is conflicting with the inference control information, the image processing device 100 may perform image quality processing on the object according to the user's real-time control information. The image processing device 100 may output an image obtained by performing image quality processing.

An operating method of an image processing device, and a device, according to some embodiments, may also be implemented in the form of a recording medium including instructions executable by a computer, such as a computer-executable program module. A computer-readable medium may be an arbitrary usable medium accessible by a computer, and includes all of volatile and non-volatile media and removable and non-removable media. In addition, the computer-readable medium may include both computer storage media and communication media. The computer storage media may include volatile and non-volatile, removable and non-removable media implemented by an arbitrary method or technique for storing information such as computer-readable instructions, data structures, program modules, or other data. The communication media includes other data of a modulated data signal, such as computer-readable instructions, data structures, program modules, or carrier waves, or other transmission mechanism, and includes an arbitrary information transferring medium.

In addition, the image processing device and the operating method thereof according to an embodiment of the present disclosure described above may be implemented as a computer program product including computer-readable recording medium/storage medium having recorded thereon a program for implementing an image processing method including the steps of: obtaining, from a first image, object information of an important included in the first image; obtaining user control information for image quality processing; obtaining, from the first image, a second image by performing image quality processing on the important object based on the object information and the user control information.

A machine-readable storage medium may be provided in the form of a non-transitory storage medium. Here, the term "non-transitory storage medium" simply denotes that it is a tangible device and does not contain signals (e.g., electromagnetic waves), and this term does not differentiate between a case where data is semi-permanently stored in the storage medium and a case where data is temporarily stored therein. For example, the "non-transitory storage medium" may include a buffer in which data is temporarily stored.

According to an embodiment, the method according to the various embodiments disclosed in the present document may be included in a computer program product and provided. Computer program products are commodities and may be traded between sellers and buyers. Computer program products may be distributed in the form of machine-readable storage media (e.g., compact disc read only memory (CD-ROM)), may be distributed through an application store, or may be distributed (e.g., downloaded or uploaded) online directly between two user devices (e.g., smartphones). In the case of online distribution, at least some of computer program products (e.g., downloadable apps) may be at least temporarily stored in machine-readable storage media such as a server 150 of a manufacturer, a server 150 of an application store, or a memory of a relay server 150, or may be temporarily generated.

The above description of the disclosure is provided for illustration, and it will be understood by one of ordinary skill in the art that various changes in form and details may be readily made therein without departing from essential features and the scope of the disclosure as defined by the following claims. Accordingly, the embodiments described above are examples in all aspects and are not limited. For example, each component described as a single type may be implemented in a distributed manner, and similarly, components described as distributed may be implemented in a combined form.

The invention claimed is:

1. An image processing device comprising:
- a memory storing one or more instructions; and
- a processor configured to execute the one or more instructions stored in the memory to:
  - obtain, from a first image, object information about an object that attracts a user's attention for image processing,
  - receive a user control command for image processing, wherein the user control command specifies outline processing and flattening processing to be applied to the object that attracts the user's attention,
  - obtain control information including the user control command, and
  - obtain a second image by performing the image processing on the object that attracts the user's attention based on the object information and the control information,
  - wherein the outline processing and the flattening processing are performed based on at least one of a parameter obtained based on the user control command or a parameter obtained using a neural network.

2. The image processing device of claim 1, wherein the object information includes information about at least one of a type, location, and size of the object that attracts the user's attention.

3. The image processing device of claim 1, wherein the processor is further configured to execute the one or more instructions to:
- detect a plurality of objects from the first image,
- output object identification information indicating the plurality of objects, and
- identify an object selected by the user as the object that attracts the user's attention to correspond to the outputting of the object identification information.

4. The image processing device of claim 1, wherein the user control command further specifies at least one of whether to enlarge an object or a degree of enlargement of the object.

5. The image processing device of claim 1, wherein the processor is further configured to execute the one or more instructions to perform, according to the control information, the outline processing around the object and the flattening processing of an inside of the object.

6. The image processing device of claim 1, wherein
- the control information comprises at least one of inference control information and real-time user control information,
- the inference control information is obtained from previous control history information of a user for a previous image, and
- the real-time user control information comprises real-time control information of the user for the first image.

7. The image processing device of claim 1, wherein
- the processor is further configured to execute the one or more instructions to obtain the second image from the first image by using a neural network, and
- the neural network is a neural network that has learned an input image, an object area of interest to a user in the input image, and a ground truth image obtained by processing the object area of interest to the user, as a learning data set.

8. The image processing device of claim 7, wherein the neural network obtains the second image in which an object is image processed from at least one of the first image, the control information, and the object information.

9. The image processing device of claim 7, wherein
- the neural network obtains flattening parameters and outline parameters for image processing for an object from at least one of the first image, user control information, and the object information, and
- the processor is further configured to execute the one or more instructions to obtain the second image processed by adjusting, according to the user control command, a blending degree of the first image processed according to the flattening parameters and the first image processed according to the outline parameters.

10. The image processing device of claim 1, wherein the image processing further comprises upscaling of the object in addition to the outline processing, and the flattening processing, the outline processing comprises processing of at least one of a detail, intensity, and color of an outline of the object, the flattening processing comprises processing of adjusting a flattening degree of an inside of the object, and the upscaling comprises enlarging a size of the object while maintaining a resolution of the object.

11. An image processing method performed by an image processing device, the image processing method comprising:

obtaining, from a first image, object information about an object that attracts a user's attention included in the first image for image processing;

receiving a user control command for image processing, wherein the user control command specifies outline processing and flattening processing to be applied to the object that attracts the user's attention;

obtaining control information including the user control command for image processing; and obtaining, from the first image, a second image by performing image processing on the object that attracts the user's attention based on the object information and user control information, wherein the outline processing and the flattening processing are performed based on at least one of a parameter obtained based on the user control command or a parameter obtained using a neural network.

12. The image processing method of claim 11, wherein the object information comprises information about at least one of a type, location, and size of the object that attracts the user's attention.

13. The image processing method of claim 11, further comprising:

detecting a plurality of objects from the first image;

outputting object identification information indicating the plurality of objects; and identifying an object selected by a user as the object that attracts the user's attention to correspond to the outputting of the object identification information.

14. The image processing method of claim 11, wherein the user control command further specifies at least one of whether to enlarge the object that attracts the user's attention or a degree of enlargement of the object that attracts the user's attention.

15. A non-transitory computer-readable recording medium having recorded thereon a program for implementing an image processing method, the image processing method comprising:

obtaining, from a first image, object information about an object that attracts a user's attention included in the first image for image processing;

receiving a user control command for image processing, wherein the user control command specifies outline processing and flattening processing to be applied to the object that attracts the user's attention;

obtaining control information including the user control command for image processing; and obtaining, from the first image, a second image by performing image processing on the object that attracts the user's attention based on the object information and user control information, wherein the outline processing and the flattening processing are performed based on at least one of a parameter obtained based on the user control command or a parameter obtained using a neural network.

* * * * *